US012610957B2

(12) United States Patent
Huber et al.

(10) Patent No.: US 12,610,957 B2
(45) Date of Patent: Apr. 28, 2026

(54) COMPOSITIONS AND METHODS OF CONTROLLING PESTS

(71) Applicant: Pertinent Eco-Solutions Inc., Peachtree Corners, GA (US)

(72) Inventors: Scot Kevin Huber, Raleigh, NC (US); Ronald Hatton, Jr., Raleigh, NC (US); Bruno Jactel, Raleigh, NC (US); William Geigle, Asheville, GA (US)

(73) Assignee: Pertinent Eco-Solutions Inc., Peachtree Corners, GA (US)

( * ) Notice: Subject to any disclaimer, the term of this patent is extended or adjusted under 35 U.S.C. 154(b) by 644 days.

(21) Appl. No.: 17/977,835

(22) Filed: Oct. 31, 2022

(65) Prior Publication Data

US 2023/0137223 A1     May 4, 2023

Related U.S. Application Data

(60) Provisional application No. 63/274,383, filed on Nov. 1, 2021.

(51) Int. Cl.

| | |
|---|---|
| *A01N 65/44* | (2009.01) |
| *A01N 25/04* | (2006.01) |
| *A01N 25/30* | (2006.01) |
| *A01N 31/02* | (2006.01) |
| *A01N 31/16* | (2006.01) |
| *A01N 65/06* | (2009.01) |
| *A01N 65/22* | (2009.01) |
| *A01N 65/24* | (2009.01) |
| *A01N 65/28* | (2009.01) |
| *A01N 65/42* | (2009.01) |
| *A01P 7/04* | (2006.01) |
| *A23K 20/158* | (2016.01) |
| *A23K 20/195* | (2016.01) |
| *A23L 33/10* | (2016.01) |
| *A23L 33/115* | (2016.01) |

(52) U.S. Cl.
CPC ............. *A01N 65/44* (2013.01); *A01N 25/04* (2013.01); *A01N 25/30* (2013.01); *A01N 31/02* (2013.01); *A01N 31/16* (2013.01); *A01N 65/06* (2013.01); *A01N 65/22* (2013.01); *A01N 65/24* (2013.01); *A01N 65/28* (2013.01); *A01N 65/42* (2013.01); *A01P 7/04* (2021.08); *A23K 20/158* (2016.05); *A23K 20/195* (2016.05); *A23L 33/115* (2016.08); *A23L 33/127* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 7,514,102 | B1 | 4/2009 | Overman |
| 8,231,887 | B2 | 7/2012 | Sims |
| 8,501,247 | B2 | 8/2013 | Enan et al. |
| 8,685,471 | B2 | 4/2014 | Enan et al. |
| 8,691,256 | B2 | 4/2014 | Enan |
| 8,734,869 | B2 | 5/2014 | Enan |
| 10,064,836 | B2 | 9/2018 | Enan et al. |
| 10,368,543 | B2 | 8/2019 | Enan |
| 10,881,104 | B2 | 1/2021 | Kennedy et al. |
| 11,039,623 | B2 | 6/2021 | Schmidt et al. |
| 2003/0194454 | A1 | 10/2003 | Bessette et al. |
| 2007/0178128 | A1 | 8/2007 | Bessette |
| 2013/0034619 | A1 | 2/2013 | Benoit |
| 2013/0183392 | A1 | 7/2013 | Moore et al. |
| 2015/0086656 | A1 | 3/2015 | Bailey-Jackson |
| 2015/0087516 | A1 | 3/2015 | Enan |
| 2015/0132413 | A1 | 5/2015 | Bessette et al. |
| 2016/0037775 | A1 | 2/2016 | Funke et al. |
| 2018/0255747 | A1 | 9/2018 | Barthle |
| 2018/0255787 | A1 | 9/2018 | Manhas et al. |
| 2019/0274312 | A1 | 9/2019 | Bissinger et al. |
| 2022/0361507 | A1 | 11/2022 | Jactel et al. |

FOREIGN PATENT DOCUMENTS

| | | |
|---|---|---|
| AU | 2021393390 A1 | 6/2023 |
| BR | 112022009091 A2 | 7/2022 |
| CA | 2408173 A1 | 12/2001 |
| EP | 4059030 A1 | 9/2022 |
| WO | 2021/096947 A1 | 5/2021 |

OTHER PUBLICATIONS

International Search Report and Written Opinion received for PCT Patent Application No. PCT/US2022/048452, mailed on Feb. 9, 2023, 9 pages.
International Preliminary Report on Patentability received for PCT Patent Application No. PCT/US2020/059999, mailed on May 27, 2022, 6 pages.
International Search Report and Written Opinion received for PCT Patent Application No. PCT/US2020/059999, mailed on Feb. 9, 2021, 7 pages.
Nicolopoulou-Stamati, P., et al., "Chemical Pesticides and Human Health: The Urgent Need for a New Concept in Agriculture", Frontiers in Public Health, vol. 4, Article 148, 2016, 8 pages.
Zhang, W., et al., "Global pesticide use: Profile, trend, cost / benefit and more", Proceedings of the International Academy of Ecology and Environmental Sciences, vol. 8, No. 1, 2018, pp. 1-27.

(Continued)

*Primary Examiner* — Michael V Meller
(74) *Attorney, Agent, or Firm* — Judy Jarecki-Black; Sharon Ngwenya

(57) ABSTRACT

Described herein are compositions and methods to be used in controlling pests, such as arthropods, nematodes, helminths, insect pests, internal parasites, and external parasites. Such compositions make use of at least a blend of one or more essential oils and, optionally, additional components, such as surfactants, emulsifiers, solvents, additives, and inerts. Compositions can be applied to a variety of locations to control pests or can also be added into feed or foodstuffs to afford internal pest control.

8 Claims, 3 Drawing Sheets

(56) References Cited

OTHER PUBLICATIONS

Anon.: "Celite 610 Mechanical Insecticide", https://earthwiseagriculture.net/wp-content/uploads/2021/12/Celite-610-Mechanical-Insecticide.pdf, pp. 1-2.

Anon.: "Essentria IC3 Insecticide Concentrate", https://labelsds.com/images/user_uploads/Essentria%20IC-3%20Label%2011-1-19.pdf, pp. 1-3.

Extended European Search Report issued in connection with European application number EP22888300, dated Aug. 25, 2025, 12 pages.

COMPOSITIONS AND METHODS OF CONTROLLING PESTS

REFERENCE TO RELATED APPLICATIONS

This application is a United States Non-Provisional Patent Application of U.S. Provisional Application Ser. No. 63/274,383, filed Nov. 1, 2021, which is hereby incorporated by this reference in its entirety.

TECHNICAL FIELD OF THE INVENTION

This invention is generally related to compositions and methods of repelling, killing, and/or resisting pests.

BACKGROUND OF THE INVENTION

It is estimated that by 2050 the world's population will reach 9.1 billion, 34 percent higher than today. In order to feed this larger, more urban and richer population, food production must increase by 70 percent. Annual cereal production will need to rise to about 3 billion tons from 2.1 billion today and annual meat production will need to rise by over 200 million tons to reach 470 million tons. (Food and Agriculture Organization, 1-35 2009) But the necessary increased in production can be jeopardized by the detrimental impact of pests and parasites. Globally, in total of approximately 9000 species of insects and mites, 50000 species of plant pathogens, and 8000 species of weeds injure crops, of which insect pests caused an estimated 14% by weight of loss. (Zhang, W. J., IAEES, 8(1): 1-27 2018)

Therefore, pesticides are used widely in agriculture to improve yields and animal protein production. Their role is to control pests: herbicide, insecticides, nematicide, molluscicide, piscicide, avicide, rodenticide, bactericide, insect repellent, animal repellent, antimicrobial, fungicide and parasiticides for the control of internal parasites.

In addition, parasiticides are widely used to control Soil Transmitted Helminths in animals and humans. Soil-transmitted helminth infections are among the most common infections worldwide and affect the poorest and most deprived communities. They are transmitted by eggs present in human feces which in turn contaminate soil in areas where sanitation is poor. According to WHO, more than 1.5 billion people, or 24% by weight of the world's population, are infected with soil-transmitted helminth infections worldwide. Infections are widely distributed in tropical and subtropical areas, with the greatest numbers occurring in sub-Saharan Africa, the Americas, China and East Asia. Over 267 million preschool-age children and over 568 million school-age children live in areas where these parasites are intensively transmitted and are in need of treatment and preventive interventions. (World Health Organization, "Soil-transmitted helminth infections", 2002)

Moreover, pesticides and related compositions are used in the treatment of premises inhabited or used by people and/or animals. These include, for example, homes, apartment buildings, bakeries, beverage plants, bottling facilities, breweries, cafeterias, candy plants, canneries, cereal processing and manufacturing plants, dairy barns, poultry facilities, stock yards, flour mills, food processing plants, frozen food plants, homes, hospitals, hotels, houses, industrial buildings, kennels, kitchens, laboratories, manufacturing facilities, mausoleums, meat processing and packaging plants, meat and vegetable canneries, motels, nursing homes, office buildings, restaurants, schools, stores, supermarkets, warehouses and similar structures, building foundations, dairy facilities, drive-in restaurants, drive-in theaters, golf courses, parks, playgrounds, poultry houses, recreational areas, schools, urban areas, lawns, landscape areas, trees, turf, areas around bodies of water, and zoos. Great needs still exist for such pesticides for these applications.

Chemical pesticides and parasiticides have a high toxicity profile and numerous side effects. Many of the pesticides have been associated with health and environmental issues. The numerous negative health effects that have been associated with chemical pesticides include dermatological, gastrointestinal, neurological, carcinogenic, respiratory, reproductive, and endocrine effects. Furthermore, high occupational, accidental, or intentional exposure to pesticides can result in hospitalization and death. (Nicolopoulou-Stamati, P., et al., Front. Public Health, 4: 148 2016) Residues of pesticides can be found in a great variety of everyday foods and beverages. Pesticides residues have also been detected in human breast milk samples, and there are concerns about prenatal exposure and health effects in children.

In addition, just as the effectiveness of antibiotics in the control of human disease is under threat due to the evolution of resistant strains of bacteria, the control of agricultural pests and crop diseases is threatened by the evolution of pesticide resistance, affecting insecticides, herbicides, parasiticides and fungicides. (5)

Therefore, because pesticides have a high toxicity profile and are less efficacious due to increased resistance, there is a need to find alternatives. Once such alternative can in some aspects be referred to as a new class of less toxic pesticides called biocides or biopesticides. What is needed are new biocides, biopesticides or other less toxic pesticides capable of repelling certain animals and insects, and/or killing certain insects and internal parasites. Such pesticides are needed that do not present any known risks to humans or the environment. Such unmet needs are addressed by the instant disclosure.

SUMMARY OF THE INVENTION

It is to be understood that this summary is not an extensive overview of the disclosure. This summary is exemplary and not restrictive and it is intended to neither identify key or critical elements of the disclosure nor delineate the scope thereof. The sole purpose of this summary is to explain and exemplify certain concepts of the disclosure as an introduction to the following complete and extensive detailed description.

The present disclosure relates to compositions of one or more essential oils and blends thereof. Such oils or blends can be combined with components including but not limited to a surfactant, an emulsifier, a solvent, a variety of inerts, and any combinations thereof. Compositions described herein possess repelling, killing, and/or resisting effects against a wide variety of pests.

Essential oils may be selected from a variety of essential oils known in the art. Blends of essential oils include but are not limited to two, three, four, five, or more essential oils. Essential oils may comprise about 1% by weight up to about 75% by weight by weight of compositions described herein. As non-limiting examples, one or more essential oils to be used in one or more compositions described herein include but are not limited to geraniol, linalool, carvacrol, para-cymene, alpha-pinene, menthol, eugenol, carvacrol, citronella oil, citronellal, citronellol, cinnamaldehyde, cinnamol, mint oils including cornmint oil and peppermint oil, thyme oil, lemongrass oil, rosemary oil, oregano oil, clove oil, citronella oil, cedar oil, cinnamon oil, wintergreen oil, alpha-terpineol, camphor, carvacrol, delta-cadinene, e-beta-caryophyllene, e-sabinene, limonene, p-cymene-8-ol, cerpinen-4-ol, terpinolene, thymol vic-thymol, cedrol, 1,8-cineol, 3-carene, 3-octanol, 3-octanone, 6-ethyl-3,4-dimethylphenol, alpha-humulene, alpha-phellandrene, alpha-pinene, alpha-terpinene, alpha-thujene, aromadendrene, beta-pinene, beta-terpinene, borneol, bornyl acetate, camphene, carvacrol methyl ether, carvone, R-carvone, caryophyllene oxide, citronellal, citronellol, citronellal, e-beta-ocimene, eugenol, gamma-terpinene, geranyl acetate, isoeugenol, ledene, lemongrass oil, limonene, Linalool, menthol, methyl isoeugenol, methyl salicylate, myrcene, nerol, nootkatone, ocimene, p-cymene, safrol, terpinene-4-ol, terpineol, thymol acetate, Z-beta-ocimene, Z-linalool oxide, and any combinations thereof.

Surfactants may be selected from a variety of surfactants known in the art. Surfactants may also include detergents. Blends of surfactants include but are not limited to two, three, four, five, or more surfactants. Surfactants may comprise about 1% by weight up to about 50% by weight by weight of compositions described herein. As non-limiting examples, one or more surfactants to be used in one or more compositions described herein include but are not limited to organosulfates or organosulfonates (such as sodium lauryl sulfate or sodium laureth sulfate), soaps (e.g. $C_6$-$C_{20}$ fatty acid metal salts, such as sodium caprylate or potassium laurate, or the saponification products of long-chain fatty acids or fatty acid esters), or other detergents, and combinations thereof.

Emulsifiers may be selected from a variety of emulsifiers known in the art. Blends of emulsifiers include but are not limited to two, three, four, five, or more emulsifiers. Emulsifiers may comprise about 0.1% by weight up to about 5% by weight by weight of compositions described herein. As non-limiting examples, one or more emulsifiers to be used in one or more compositions described herein include but are not limited to glyceryl esters, glyceryl ester derivatives (such as polyglyceryl oleate), xanthan gum, carboxymethyl cellulose, sodium alginate, and other such materials.

Solvents may be selected from a variety of solvents known in the art. Blends of solvents include but are not limited to two, three, four, five, or more solvents. Solvents may comprise about 1% by weight up to about 90% by weight by weight of compositions described herein. As non-limiting examples, one or more solvents to be used in one or more compositions described herein include but are not limited to water, ethyl lactate, isopropyl alcohol, butyl lactate, mineral oil, castor oil, and combinations thereof.

Additives may be selected from a variety of additives known in the art. Blends of additives include but are not limited to two, three, four, five, or more additives. Additives may comprise about 5% by weight up to about 20% by weight by weight of compositions described herein. As non-limiting examples, one or more additives to be used in one or more compositions described herein include but are not limited to Celite 610.

An inert ingredient or combination of inert ingredients may be selected from a variety of inert ingredients known in the art. Blends of inert ingredients include but are not limited to two, three, four, five, or more inert ingredients. Inert ingredients may comprise about 0.5% by weight up to about 98% by weight by weight of compositions described herein. As non-limiting examples, one or more inert ingredients to be used in one or more compositions described herein include but are not limited to almond oil, ascorbyl palmitate, (+)-butyl lactate, butyl lactate, butyl stearate, calcium carbonate, calcium oxide silicate, calcium silicate, carbon dioxide, carboxymethyl cellulose, carnauba wax, caseins, castor oil, hydrogenated castor oil, cellulose, cellulose carboxymethyl ether, sodium salt, citric acid, citric acid monohydrate, cod-liver oil, corn cobs, cottonseed meal, decanoic acid monoester, 1,2,3-propanetriol, dextrins, diglyceryl monooleate, diglyceryl monostearate, dilaurin, dipalmitin, dipotassium citrate, disodium citrate, disodium sulfate, diatomaceous earth, dodenoic acid monoester, (+)-ethyl lactate, ethyl lactate, glycerin, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, glyceryl stearate, hydrogenated cottonseed, hydrogenated rapeseed, hydrogenated soybean, hydroxyethyl cellulose, hydroxypropyl cellulose, hydroxypropyl methyl cellulose, isopropyl alcohol, isopropyl myristate, lauric acid, linseed oil, magnesium oxide, magnesium oxide silicate, magnesium silicate, magnesium silicate hydrate, magnesium silicon, mineral oil, 1-monolaurin, 1-monomyristin, monomyristin, monopalmitin, monopotassium citrate, monosodium citrate, myristic acid, octanoic acid, potassium salt, oleic acid, palm oil, hydrogenated palm oil, palmitic acid, paraffin wax, polyethylene, polyglyceryl oleate, polyglyceryl stearate, anhydrous potassium aluminum silicate, potassium bicarbonate, potassium chloride, potassium citrate, potassium myristate, potassium oleate, potassium ricinoleate, potassium sorbate, potassium stearate, 1,2-propylene carbonate, amorphous fumed silica, amorphous silica precipitate and gel, silica, silica gel, precipitated crystalline-free silica gel, silica hydrate, vitreous silica, silicic acid, magnesium salt, soap, sodium alginate, sodium bicarbonate, sodium carboxymethyl cellulose, sodium chloride, sodium oleate, sodium ricinoleate, sodium stearate, sodium sulfate, tetraglyceryl monooleate, triethyl citrate, vanillin, vitamin E, wheat germ oil, wheat oil, white mineral oil, wintergreen oil, and xanthan gum.

As a non-limiting example, a composition may include a formulation of an essential oil or combination of essential oils (including but not limited to geraniol, citronella oil, cornmint oil, thyme oil, cedarwood oil, clove oil, peppermint oil, and eugenol), an additive (including but not limited to celite), a surfactant or combination of additives (including but not limited to sodium cocoate, potassium oleate, potassium salt of $C_8$-$C_{10}$ fatty acids, potassium cocoate, and sodium lauryl sulfate), an emulsifier (including but not limited to polyglyceryl oleate), and a solvent or combination of solvents (including but not limited to water, ethyl lactate, isopropyl alcohol, castor oil, butyl lactate, and mineral oil).

Compositions described herein act as biocides, pesticides, inseciticides, nematicides, anthemlminthics, repellents, parasiticides, and the like. Compositions described herein can additionally have antimicrobial effects and act as bactericides, antibacterials, antivirals, antifungals, and/or herbicides. Compositions described herein can be used against or for arthropods and external and internal parasites affecting humans, animals, and crops. Exemplary arthropods, helminths, nematodes, protozoa, and the like to be treated by compositions disclosed herein are provided. Compositions described herein exhibit additive and synergistic effects in repelling, killing, and/or resisting pests.

Components and concentrations to be used in compositions described herein are selected based on factors concerning the composition's application. Presence of crops, humans, and/or animals in the application area, the species of pest to be repelled and/or killed, and the quantity of pests in the area may individually or in combination affect selections.

The present disclosure relates to compositions additionally configured as concentrate formulations. Concentrate formulations can be diluted prior to use. As a non-limiting example, 1 part concentrate may be combined with about 1 part up to about 199 parts diluent prior to use. As an additional non-limiting example, 1 part concentrate may be combined with about 1 part up to about 50 parts diluent prior to use.

The present disclosure relates to methods of repelling, killing, and/or resisting effects of one or more pests. Such methods include administering one or more composition(s) as described herein to a subject or location in need of treatment. Compositions may be administered through a feed or foodstuff to be consumed by a subject for which pest-resistance is desired. Administration also includes treating location(s) by applying (e.g. via spray bottle, sprinkler system, etc.) one or more compositions described herein in, on, around, or near the location(s) to be treated. Such administration repels, kills, and/or resists pests and parasites in, on, around, or near the location(s). Location(s) include but are not limited to homes, apartment buildings, bakeries, beverage plants, bottling facilities, breweries, cafeterias, candy plants, canneries, cereal processing and manufacturing plants, dairy barns, poultry facilities, stock yards, flour mills, food processing plants, frozen food plants, homes, hospitals, hotels, houses, industrial buildings, kennels, kitchens, laboratories, manufacturing facilities, mausoleums, meat processing and packaging plants, meat and vegetable canneries, motels, nursing homes, office buildings, restaurants, schools, stores, supermarkets, warehouses and similar structures, building foundations, dairy facilities, drive-in restaurants, drive-in theaters, golf courses, parks, playgrounds, poultry houses, recreational areas, schools, urban areas, lawns, landscape areas, trees, turf, areas around bodies of water, and zoos.

DETAILED DESCRIPTION OF THE INVENTION

I. Definitions

Figure 1A:
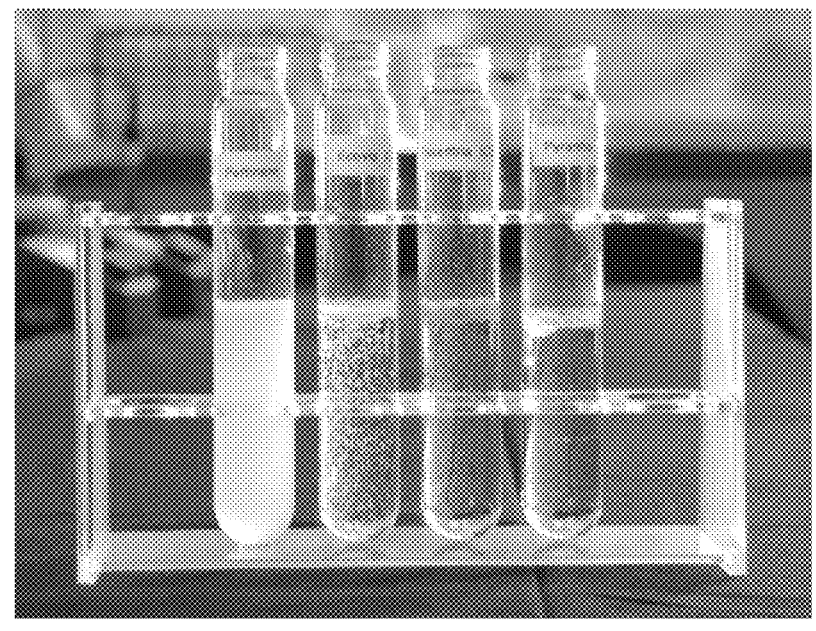
FIGS. 1A-1B display homogeneity and stability of solutions of the current invention (far left) and other brands (three right vials).

It should be appreciated that this disclosure is not limited to the compositions and methods described herein as well as the experimental conditions described, as such may vary. It is also to be understood that the terminology used herein is for the purpose of describing certain embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. References to techniques employed herein are intended to refer to the techniques as commonly understood in the art, including variations on those techniques or substitutions of equivalent techniques that would be apparent to one skilled in the art. Although any compositions, methods and materials similar or equivalent to those described herein can be used in the practice or testing of the present invention. All publications mentioned are incorporated herein by reference in their entirety.

In describing the presently disclosed subject matter, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10% by weight; in other embodiments the values may range in value either above or below the stated value in a range of approx. +/−5% by weight; in other embodiments the values may range in value either above or below the stated value in a range of approx. +/−2% by weight; in other embodiments the values may range in value either above or below the stated value in a range of approx. +/−1% by weight. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, percentages relating to compositions and components thereof are given as weight percentages, unless otherwise specified. As a non-limiting example, a composition comprising 50% by weight essential oil would owe half of its weight to the essential oil in the composition. It is to be understood, however, that references to diluents refer to volume. As a non-limiting example, 1 part concentrate to 20 parts diluent would refer to 1 volumetric unit of concentrate to be combined with 20 volumetric units of diluent.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the terms "repel", "inhibit", "suppress", "repress", "control", and grammatical variants thereof are used interchangeably and refer to an activity whereby pest (e.g., arthropods, internal parasites, external parasites, and the like) activity and/or viability is reduced below that observed in the absence of a composition of the presently disclosed subject matter. In some embodiments, pest control that results in repels or inhibits results in a decrease in the presence and/or survivability of an arthropod or insect in an environment or on a subject. It is to be understood that the acts described above can be applied to any life cycle of a pest.

As used herein, the term "killing" refers to the act of causing the death of pests (e.g., arthropods, internal parasites, external parasites, and the like), wherein this act can occur as a result of administration of compositions described herein. In this manner, any composition resulting in killing can be described with the suffix "-cide". It is to be understood that this act can be applied to any life cycle of a pest.

II. Compositions and Methods for Controlling Pests

A. Compositions Comprising Essential Oils

Disclosed herein is a series of formulations made of combinations of essential oils (i.e. a blend of one or more essential oils) with demonstrated activities in a variety of pests. Pests include but are not limited to multiple species of arthropods (e.g., insects, arachnids, and other such arthropods), internal and external parasites (e.g., nematodes, helminths, protozoa, and other such parasites), and a variety of other pests known in the art and described below that have potential applications in agriculture, human and animal health. Inspect pests may include but are not limited to flies, fleas, ticks, mites, and other such insects as known in the art and described below. In some embodiments, the essential oils blend can have a synergistic effect on controlling arthropods and internal parasites. In some embodiments, such formulations are provided in a concentrate to be diluted upon application.

In some embodiments, provided herein are biocide, pesticide, and/or parasiticide compositions, the compositions comprising a blend of one or more essential oils and one or more additional components, the composition having a repelling, killing and/or resisting effect against one or more pests, as described herein. In some aspects, such biocide, pesticide, or parasiticide compositions can comprise a blend of one or more essential oils and one or more components selected from the group consisting of a surfactant, an emulsifier and a solvent, the composition having a repelling, killing and/or resisting effect against one or more pests, as described herein. In some aspects, the composition can include at least two of the one or more components selected from the group consisting of a surfactant, an emulsifier and a solvent. In some aspects, the composition can include each of the one or more components selected from the group consisting of a surfactant, an emulsifier and a solvent. In some additional aspects, the composition may further comprise an inert substance.

In some aspects, the disclosed compositions are provided in a concentrate formulation and configured to be diluted prior to use. In some embodiments, the concentrate formulation can be diluted from about 1 part concentrate to about 0.25 parts up to about 1000 parts diluent. In preferred embodiments, concentrate formulation can be diluted from about 1 part concentrate to about 8 parts up to about 256 parts diluent. Additional non-limiting examples of dilutions include but are not limited to 1 part concentrate to about 10 parts up to about 250 parts diluent, 20 parts up to about 240 parts diluent, 30 parts up to about 230 parts diluent, 40 parts up to about 220 parts diluent, 50 parts up to about 210 parts diluent, 60 parts up to about 200 parts diluent, 70 parts up to about 190 parts diluent, 80 parts up to about 180 parts diluent, 90 parts up to about 170 parts diluent, 100 parts up to about 160 parts diluent, 110 parts up to about 150 parts diluent, and 120 parts up to about 140 parts diluent. Diluents may comprise solvents. Solvents used for dilution include but are not limited to water, mineral oil, kerosene, and other such solvents suitable for use in dilution, as known in the art. In additional aspects, concentrate formulations may be directly administered to a subject or location in need thereof. In such aspects, concentrates may be directly loaded into and administered through a variety of means known in the art including, but not limited to, sprinkler or misting systems, spray bottles, misters, foggers, backpack sprayers, truck-mounted sprayers, towed sprayers, trailer-mounted sprayers, handheld sprayers, aerial sprayers, oilers, rubs, and other such methods known in the art. Such an aspect comprises an ultra-low volume (ULV) application where only a small amount of the concentrate is needed to be administered given its higher concentration of components. As a non-limiting example, ULV applications may only require about 4 up to about 10 ounces per acre.

In some aspects, compositions disclosed herein are made into powders through dehydration methods known in the art. Powdering disclosed compositions presents a number of benefits including but not limited to lowered weight for transportation, increased ease of packaging, improved storage, and the like. Powdered formulations of compositions disclosed herein can be rehydrated at time of use through one or more additions of liquids. Upon rehydration, the now liquid solution can be administered through a variety of methods that are disclosed herein.

The blend of one or more essential oils can include any essential oil know or disclosed herein, including for example, but not limited to geraniol, linalool, carvacrol, para-cymene, alpha-pinene, menthol, eugenol, carvacrol, citronella oil, citronellal, citronellol, cinnamaldehyde, cinnamol, mint oils including cornmint oil and peppermint oil, thyme oil, lemongrass oil, rosemary oil, oregano oil, clove oil, citronella oil, cedar oil, cinnamon oil, wintergreen oil, alpha-terpineol, camphor, carvacrol, delta-cadinene, e-beta-caryophyllene, e-sabinene, limonene, p-cymene-8-ol, cerpinen-4-ol, terpinolene, thymol vic-thymol, cedrol, 1,8-cineol, 3-carene, 3-octanol, 3-octanone, 6-ethyl-3,4-dimethylphenol, alpha-humulene, alpha-phellandrene, alpha-pinene, alpha-terpinene, alpha-thujene, aromadendrene, beta-pinene, beta-terpinene, borneol, bornyl acetate, camphene, carvacrol methyl ether, carvone, R-carvone, caryophyllene oxide, citronellal, citronellol, citronellal, e-beta-ocimene, eugenol, gamma-terpinene, geranyl acetate, isoeugenol, ledene, lemongrass oil, limonene, Linalool, menthol, methyl isoeugenol, methyl salicylate, myrcene, nerol, nootkatone, ocimene, p-cymene, safrol, terpinene-4-ol, terpineol, thymol acetate, Z-beta-ocimene, Z-linalool oxide, and combinations thereof. In some embodiments, a composition may comprise a concentration of a blend of one or more essential oils of at least about 1% by weight up to about 75% by weight, though other concentrations may also be utilized. As non-limiting examples compositions may comprise a concentration of a blend of one or more essential oils of about 5% by weight up to about 70% by weight, about 10% by weight up to about 65% by weight, about 15% by weight up to about 60% by weight, about 20% by weight up to about 55% by weight, about 25% by weight up to about 50% by weight, about 30% by weight up to about 45% by weight, and about 35% by weight up to about 40% by weight. In an exemplary embodiment, the blend of one or more essential oils may comprise geraniol in a concentration of at least 5% by weight up to about 50% by weight, though other concentrations may also be utilized.

In some aspects of the invention, a surfactant, when utilized, may comprise, for example, organosulfates or organosulfonates such as sodium lauryl sulfate or sodium laureth sulfate; soaps ($C_6$-$C_{20}$ fatty acid metal salts, such as sodium caprylate or potassium laurate, or the saponification products of long-chain fatty acids or fatty acid esters), or other detergents. In such embodiments, the surfactant may comprise a concentration of at least about 1% by weight up to about 50% by weight of compositions described herein, though other concentrations may also be utilized. As non-limiting examples compositions may comprise a concentration of one or more surfactants of about 5% by weight up to about 50% by weight, about 10% by weight up to about 45% by weight, about 15% by weight up to about 40% by weight, about 20% by weight up to about 35% by weight, and about 25% by weight up to about 30% by weight.

In some aspects, an emulsifier, when utilized, may comprise polyglyceryl oleate, polyglyceryl stearate, glyceryl monooleate, or other glyceryl esters; or other emulsifiers selected from classes such as lecithins, EO/PO block copolymers, polyoxyethylene sorbitan monolaurates, sorbitan monolaurates, polyoxyethylene ethers, ethoxylated esters, ethoxylated triglycerides, ethoxylated alcohols, ethoxylated amines, alkylphenol ethoxylates, or tristearylphenol ethoxylates. In such embodiments, the emulsifier may comprise a concentration of at least about 0.1% by weight up to about 5% by weight of compositions described herein, though other concentrations may also be utilized. As non-limiting examples compositions may comprise a concentration of one or more emulsifiers of about 0.5% by weight up to about 4.5% by weight, about 1% by weight up to about 4% by weight, about 1.5% by weight up to about 3.5% by weight, and about 2% by weight up to about 3% by weight. In such embodiments, exemplary emulsifiers provide the overall composition with stability such that the composition may not separate out of solution over time.

In some aspects, a solvent, when utilized, may comprise water, ethyl lactate, isopropyl alcohol, butyl lactate, mineral oil, isopropyl myristate, triethyl citrate, glycerin, or a plant or animal oil such as corn oil, castor oil, linseed oil, almond oil, codliver oil, fish oil, peanut oil, soybean oil, canola oil, jojoba oil or other vegetable oil, and combinations thereof.

In some embodiments, the solvent can comprise a combination of up to three solvents, optionally each at a concentration of about 10% by weight to about 90% by weight of the overall composition. As non-limiting examples compositions may comprise a concentration of a blend of one or more solvents of about 15% by weight up to about 85% by weight, about 20% by weight up to about 80% by weight, about 25% by weight up to about 75% by weight, about 30% by weight up to about 70% by weight, about 35% by weight up to about 65% by weight, about 40% by weight up to about 60% by weight, and about 45% by weight up to about 55% by weight.

The composition may also comprise an additive such as sodium silicate, calcium silicate, magnesium silicate, or other silcate metal salts; silica, silica gel, Celite, diatomaceous earth; or clays such as bentonite, fuller's earth, montmorillonite, or kaolin; or a powdered mineral such as dolomite, calcium carbonate, gypsum, or limestone. In a particular embodiment, an additive may be Celite 610. In such aspects, the additive, when utilized, may comprise a concentration of about 3% by weight to about 25% by weight of the overall composition. As non-limiting examples compositions may comprise a concentration of of one or more additives of about 5% by weight up to about 22.5% by weight, about 7.5% by weight up to about 20% by weight, about 10% by weight up to about 17.5% by weight, and about 12.5% by weight up to about 15% by weight.

The composition can also further include any inert or combination of inerts selected from Table 1 provided below. In exemplary aspects, an inert or combination of inerts may be selected from the group comprising almond oil, ascorbyl palmitate, (+)-butyl lactate, butyl lactate, butyl stearate, calcium carbonate, calcium oxide silicate, calcium silicate, carbon dioxide, carboxymethyl cellulose, carnauba wax, caseins, castor oil, hydrogenated castor oil, cellulose, cellulose carboxymethyl ether, sodium salt, citric acid, citric acid monohydrate, cod-liver oil, corn cobs, cottonseed meal, decanoic acid monoester, 1,2,3-propanetriol, dextrins, diglyceryl monooleate, diglyceryl monostearate, dilaurin, dipalmitin, dipotassium citrate, disodium citrate, disodium sulfate, diatomaceous earth, dodenoic acid monoester, (+)-ethyl lactate, ethyl lactate, glycerin, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, glyceryl stearate, hydrogenated cottonseed, hydrogenated rapeseed, hydrogenated soybean, hydroxyethyl cellulose, hydroxypropyl cellulose, hydroxypropyl methyl cellulose, isopropyl alcohol, isopropyl myristate, lauric acid, linseed oil, magnesium oxide, magnesium oxide silicate, magnesium silicate, magnesium silicate hydrate, magnesium silicon, mineral oil, 1-monolaurin, 1-monomyristin, monomyristin, monopalmitin, monopotassium citrate, monosodium citrate, myristic acid, octanoic acid, potassium salt, oleic acid, palm oil, hydrogenated palm oil, palmitic acid, paraffin wax, polyethylene, polyglyceryl oleate, polyglyceryl stearate, anhydrous potassium aluminum silicate, potassium bicarbonate, potassium chloride, potassium citrate, potassium myristate, potassium oleate, potassium ricinoleate, potassium sorbate, potassium stearate, 1,2-propylene carbonate, amorphous fumed silica, amorphous silica precipitate and gel, silica, silica gel, precipitated crystalline-free silica gel, silica hydrate, vitreous silica, silicic acid, magnesium salt, soap, sodium alginate, sodium bicarbonate, sodium carboxymethyl cellulose, sodium chloride, sodium oleate, sodium ricinoleate, sodium stearate, sodium sulfate, tetraglyceryl monooleate, triethyl citrate, vanillin, vitamin E, wheat germ oil, wheat oil, white mineral oil, wintergreen oil, and xanthan gum. In such aspects, an inert or combination of inerts can comprise a concentration of about 0.5% by weight to about 98% by weight of an overall composition. As non-limiting examples compositions may comprise a concentration of one or more inerts of about 5% by weight up to about 95% by weight, about 10% by weight up to about 90% by weight, about 15% by weight up to about 85% by weight, about 20% by weight up to about 80% by weight, about 25% by weight up to about 75% by weight, about 30% by weight up to about 70% by weight, about 35% by weight up to about 65% by weight, about 40% by weight up to about 60% by weight, and about 45% by weight up to about 55% by weight.

TABLE 1

| | Inert List | |
|---|---|---|
| Label Display Name | Chemical Name | CAS No. |
| Acetyl tributyl citrate | Citric acid, 2-(acetyloxy)-, tributyl ester | 77-90-7 |
| Agar | Agar | 9002-18-0 |
| Almond hulls | Almond hulls | N/A |
| Almond oil | Oils, almond | 8007-69-0 |
| Almond shells | Almond shells | N/A |
| alpha-Cyclodextrin | alpha-Cyclodextrin | 10016-20-3 |
| Aluminate silicate | Aluminatesilicate | 1327-36-2 |
| Aluminum magnesium silicate | Silicic acid, aluminum magnesium salt | 1327-43-1 |
| Aluminum potassium sodium silicate | Silicic acid, aluminum potassium | 12736-96-8 |
| Aluminum silicate | sodium sal Aluminum silicate | 1331-30-4 |
| Aluminum sodium silicate | Silicic acid, aluminum sodium salt | 1344-00-9 |
| Aluminum sodium silicate | Silicic acid ($H_4 SiO_4$), aluminum sodium salt (1:1:1) | 12003-51-9 |
| Ammonium benzoate | Benzoic acid, ammonium salt | 1863-63-4 |
| Ammonium stearate | Octadecanoic acid, ammonium salt | 1002-89-7 |
| Amylopectin, acid-hydrolyzed, 1-octenylbutanedioate | Amylopectin, acid-hydrolyzed, 1-octenylbutanedioate | 113894-85-2 |
| Amylopectin, hydrogen 1-octadecenylbutanedioate | Amylopectin, hydrogen 1-octadecenylbutanedioate | 125109-81-1 |
| Animal glue | Animal glue | N/A |
| Ascorbyl palmitate | Ascorbyl palmitate | 137-66-6 |
| Attapulgite-type clay | Attapulgite-type clay | 12174-11-7 |
| Beeswax | Beeswax | 8012-89-3 |
| Bentonite | Bentonite | 1302-78-9 |
| Bentonite, sodian | Bentonite, sodian | 85049-30-5 |
| beta-Cyclodextrin | beta-Cyclodextrin | 7585-39-9 |
| Bone meal | Bone meal | 68409-75-6 |
| Bran | Bran | N/A |
| Bread crumbs | Bread crumbs | N/A |
| (+)-Butyl lactate | Lactic acid, n-butyl ester, (S) | 34451-19-9 |
| Butyl lactate | Lactic acid, n-butyl ester | 138-22-7 |
| Butyl stearate | Octadecanoic acid, butyl ester | 123-95-5 |
| Calcareous shale | Calcareous shale | N/A |
| Calcite | Calcite ($Ca(CO_3)$) | 13397-26-7 |
| Calcium acetate | Calcium acetate | 62-54-4 |
| Calcium acetate monohydrate | Acetic acid, calcium salt, monohydrate | 5743-26-0 |
| Calcium benzoate | Benzoic acid, calcium salt | 2090-05-3 |
| Calcium carbonate | Calcium carbonate | 471-34-1 |
| Calcium citrate | Citric acid, calcium salt | 7693-13-2 |
| Calcium octanoate | Calcium octanoate | 6107-56-8 |
| Calcium oxide silicate | Calcium oxide silicate ($Ca_3 O(SiO_4)$) | 12168-85-3 |
| Calcium silicate | Silicic acid, calcium salt | 1344-95-2 |
| Calcium stearate | Octadecanoic acid, calcium salt | 1592-23-0 |
| Calcium sulfate | Calcium sulfate | 7778-18-9 |
| Calcium sulfate dihydrate | Calcium sulfate dihydrate | 10101-41-4 |
| Calcium sulfate hemihydrate | Calcium sulfate hemihydrate | 10034-76-1 |
| Canary seed | Canary seed | N/A |
| Carbon | Carbon | 7440-44-0 |
| Carbon dioxide | Carbon dioxide | 124-38-9 |
| Carboxymethyl cellulose | Cellulose, carboxymethyl ether | 9000-11-7 |
| Cardboard | Cardboard | N/A |
| Carnauba wax | Carnauba wax | 8015-86-9 |
| Carob gum | Locust bean gum | 9000-40-2 |
| Carrageenan | Carrageenan | 9000-07-1 |
| Caseins | Caseins | 9000-71-9 |
| Castor oil | Castor oil | 8001-79-4 |
| Castor oil, hydrogenated | Castor oil, hydrogenated | 8001-78-3 |
| Cat food | Cat food | N/A |
| Cellulose | Cellulose | 9004-34-6 |
| Cellulose acetate | Cellulose acetate | 9004-35-7 |
| Cellulose, mixture with cellulose | Cellulose, mixture with cellulose | 51395-75-6 |

TABLE 1-continued

| | Inert List | |
|---|---|---|
| Label Display Name | Chemical Name | CAS No. |
| carboxymethyl ether, sodium salt | carboxymethyl ether, sodium salt | |
| Cellulose, pulp | Cellulose, pulp | 65996-61-4 |
| Cellulose, regenerated | Cellulose, regenerated | 68442-85-3 |
| Cheese | Cheese | N/A |
| Chlorophyll a | Chlorophyll a | 479-61-8 |
| Chlorophyll b | Chlorophyll b | 519-62-0 |
| Citric acid | Citric acid | 77-92-9 |
| Citric acid, monohydrate | Citric acid, monohydrate | 5949-29-1 |
| Citrus meal | Citrus meal | N/A |
| Citrus pectin | Citrus pectin | 9000-69-5 |
| Citrus pulp | Citrus pulp | 68514-76-1 |
| Clam shells | Clam shells | N/A |
| Cocoa | Cocoa | 8002-31-1 |
| Cocoa shell flour | Cocoa shell flour | N/A |
| Cocoa shells | Cocoa shells | N/A |
| Cod-liver oil | Cod-liver oil | 8001-69-2 |
| Coffee grounds | Coffee grounds | 68916-18-7 |
| Cookies | Cookies | N/A |
| Cork | Cork | 61789-98-8 |
| Corn cobs | Corn cobs | N/A |
| Cotton | Cotton | N/A |
| Cottonseed meal | Cottonseed meal | 68424-10-2 |
| Cracked wheat | Cracked wheat | N/A |
| Decanoic acid, monoester with 1,2,3-propanetriol | Decanoic acid, monoester with 1,2,3-propanetriol | 26402-22-2 |
| Dextrins | Dextrins | 9004-53-9 |
| Diglyceryl monooleate | 9-Octadecenoic acid, ester with 1,2,3-propanetriol | 49553-76-6 |
| Diglyceryl monostearate | 9-Octadecanoic acid, monoester with oxybis(propanediol) | 12694-22-3 |
| Dilaurin | Dodecanoic acid, diester with 1,2,3-propanetriol | 27638-00-2 |
| Dipalmitin | Hexadecanoic acid, diester with 1,2,3-propanetriol | 26657-95-4 |
| Dipotassium citrate | Citric acid, dipotassium salt | 3609-96-9 |
| Disodium citrate | Citric acid, disodium salt | 144-33-2 |
| Disodium sulfate | Disodium sulfate decahydrate | 7727-73-3 |
| Diatomaceous earth d cah drate | Kieselguhr; Diatomite (less than 1% by weight crystalline silica) | 61790-53-2 |
| Dodecanoic acid, monoester with 1,2,3-propanetriol | Dodecanoic acid, monoester with 1,2,3-propanetriol | 27215-38-9 |
| Dolomite | Dolomite | 16389-88-1 |
| Douglas fir bark | Douglas fir bark | N/A |
| Egg shells | Egg shells | N/A |
| Eggs | Eggs | N/A |
| (+)-Ethyl lactate | Lactic acid, ethyl ester, (S) | 687-47-8 |
| Ethyl lactate | Lactic acid, ethyl ester | 97-64-3 |
| Feldspar | Feldspar | 68476-25-5 |
| Ferric oxide | Iron oxide ($Fe_2O_3$) | 1309-37-1 |
| Ferrous oxide | Iron oxide (FeO) | 1345-25-1 |
| Fish meal | Fish meal | N/A |
| Fish oil | Fish oil | 8016-13-5 |
| Fuller's earth | Fuller's earth | 8031-18-3 |
| Fumaric acid | Fumaric acid | 110-17-8 |
| gamma-Cyclodextrin | gamma-Cyclodextrin | 17465-86-0 |
| Gelatins | Gelatins | 9000-70-8 |
| Gellan gum | Gellan gum | 71010-52-1 |
| Glue | Glue (as depolymd. animal collagen) | 68476-37-9 |
| Glycerin | 1,2,3-Propanetriol | 56-81-5 |
| Glycerol monooleate | 9-Octadecenoic acid (Z)-, 2,3-dihydroxypropyl ester | 111-03-5 |
| Glyceryl dicaprylate | Octanoic acid, diester with 1,2,3-propanetriol | 36354-80-0 |
| Glyceryl dimyristate | Tetradecanoic acid, diester with 1,2,3-propanetriol | 53563-63-6 |
| Glyceryl dioleate | 9-Octadecenoic acid (9Z)-, diester with 1,2,3-propanetriol | 25637-84-7 |
| Glyceryl distearate | Octadecanoic acid, diester with 1,2,3-propanetriol | 1323-83-7 |
| Glyceryl monomyristate | Tetradecanoic acid, monoester with 1,2,3-propanetriol | 27214-38-6 |
| Glyceryl monooctanoate | Octanoic acid, monoester with 1,2,3-propanetriol | 26402-26-6 |
| Glyceryl monooleate | 9-Octadecenoic acid (9Z)-, monoester with 1,2,3-propanetriol | 25496-72-4 |

TABLE 1-continued

| | Inert List | |
|---|---|---|
| Label Display Name | Chemical Name | CAS No. |
| Glyceryl monostearate | Octadecanoic acid, monoester with 1,2,3-propanetriol | 31566-31-1 |
| Glyceryl stearate | Octadecanoic acid, ester with 1,2,3-propanetriol | 11099-07-3 |
| Granite | Granite | N/A |
| Graphite | Graphite | 7782-42-5 |
| Guar gum | Guar gum | 9000-30-0 |
| Gum Arabic | Gum arabic | 9000-01-5 |
| Gum tragacanth | Gum tragacanth | 9000-65-1 |
| Gypsum | Gypsum | 13397-24-5 |
| Hematite | Hematite ($Fe_2O_3$) | 1317-60-8 |
| Humic acid | Humic acid | 1415-93-6 |
| Hydrogenated | Hydrogenated cottonseed oil | 68334-00-9 |
| Hydrogenated rapeseed cottonseed oil | Hydrogenated rapeseed oil | 84681-71-0 |
| Hydrogenated soybean oil | Hydrogenated soybean oil | 8016-70-4 |
| Hydroxyethyl cellulose oil | Cellulose, 2-hydroxyethyl ether | 9004-62-0 |
| Hydroxypropyl cellulose | Cellulose, 2-hydroxypropyl ether | 9004-64-2 |
| Hydroxypropyl methyl cellulose | Cellulose, 2-hydroxypropyl methyl ether | 9004-65-3 |
| Iron magnesium oxide | Iron magnesium oxide ($Fe_2MgO_4$) | 12068-86-9 |
| Iron oxide, hydrate | Iron oxide ($Fe_2O_3$), hydrate | 12259-21-1 |
| Iron oxide | Iron oxide ($Fe_3O_4$) | 1317-61-9 |
| Isopropyl alcohol | 2-Propanol | 67-63-0 |
| Isopropyl myristate | Isopropyl myristate | 110-27-0 |
| Kaolin | Kaolin | 1332-58-7 |
| Lactose | Lactose | 63-42-3 |
| Lactose monohydrate | Lactose monohydrate | 64044-51-5 |
| Lanolin | Lanolin | 8006-54-0 |
| Latex rubber | Latex rubber | N/A |
| Lauric acid | Lauric acid | 143-07-7 |
| Lecithins | Lecithins | 8002-43-5 |
| Licorice extract | Licorice extract | 68916-91-6 |
| Lime dolomitic | Lime (chemical) dolomitic | 12001-27-3 |
| Limestone | Limestone | 1317-65-3 |
| Linseed oil | Linseed oil | 8001-26-1 |
| Magnesium carbonate | Carbonic acid, magnesium salt (1:1) | 546-93-0 |
| Magnesium benzoate | Magnesium benzoate | 553-70-8 |
| Magnesium oxide | Magnesium oxide | 1309-48-4 |
| Magnesium oxide silicate | Magnesium oxide silicate | 12207-97-5 |
| Magnesium silicate | Magnesium silicate ($Mg_2O(Si O)$) mo | 1343-88-0 |
| Magnesium silicate hydrate | Magnesium silicate hydrate | 1343-90-4 |
| Magnesium silicon | Magnesium silicon oxide | 14987-04-3 |
| Magnesium stearate oxide | Octadecanoic acid, magnesium salt ($Mg_2Si_3O_8$) | 557-04-0 |
| Magnesium sulfate | Magnesium sulfate | 7487-88-9 |
| Magnesium sulfate heptahydrate | Magnesium sulfate heptahydrate | 10034-99-8 |
| Malic acid | Malic acid | 6915-15-7 |
| Malt extract | Malt extract | 8002-48-0 |
| Malt flavor | Malt flavor | N/A |
| Maltodextrin | Maltodextrin | 9050-36-6 |
| Methylcellulose | Cellulose, methyl ether | 9004-67-5 |
| Mica | Mica | 12003-38-2 |
| Mica-group minerals | Mica-group minerals | 12001-26-2 |
| Milk | Milk | 8049-98-7 |
| Millet seed | Millet seed | N/A |
| Mineral oil | Mineral oil (U.S.P.) | 8012-95-1 |
| 1-Monolaurin | Dodecanoic acid, 2,3-dihydroxypropyl ester | 142-18-7 |
| 1-Monomyristin | Tetradecanoic acid, 2,3-dihydroxypropyl ester | 589-68-4 |
| Monomyristin | Decanoic acid, diester with 1,2,3-propanetriol | 53998-07-1 |
| Monopalmitin | Hexadecanoic acid, monoester with 1,2,3-propanetriol | 26657-96-5 |
| Monopotassium citrate | Citric acid, monopotassium salt | 866-83-1 |
| Monosodium citrate | Citric acid, monosodium salt | 18996-35-5 |
| Montmorillonite | Montmorillonite | 1318-93-0 |
| Myristic acid | Myristic acid | 544-63-8 |
| Nepheline syenite | Nepheline syenite | 37244-96-5 |
| Nitrogen | Nitrogen | 7727-37-9 |
| Nutria meat | Nutria meat | N/A |
| Nylon | Nylon | N/A |
| Octanoic acid, potassium salt | Octanoic acid, potassium salt | 764-71-6 |
| Octanoic acid, sodium salt | Octanoic acid, sodium salt | 1984-06-1 |
| Oleic acid | Oleic acid | 112-80-1 |

TABLE 1-continued

| | Inert List | |
| --- | --- | --- |
| Label Display Name | Chemical Name | CAS No. |
| Oyster shells | Oyster shells | N/A |
| Palm oil | Palm oil | 8002-75-3 |
| Palm oil, hydrogenated | Palm oil, hydrogenated | 68514-74-9 |
| Palmitic acid | Hexadecanoic acid | 57-10-3 |
| Paper | Paper | N/A |
| Paraffin wax | Paraffin wax | 8002-74-2 |
| Peanut butter | Peanut butter | N/A |
| Peanut shells | Peanut shells | N/A |
| Peanuts | Peanuts | N/A |
| Peat moss | Peat moss | N/A |
| Pectin | Pectin | 9000-69-5 |
| Perlite | Perlite | 130885-09-5 |
| Perlite, expanded | Perlite, expanded | 93763-70-3 |
| Plaster of paris | Plaster of paris | 26499-65-0 |
| Polyethylene | Polyethylene | 9002-88-4 |
| Polyglyceryl oleate | Polyglyceryl oleate | 9007-48-1 |
| Polyglyceryl stearate | Polyglyceryl stearate | 9009-32-9 |
| Potassium acetate | Acetic acid, potassium salt | 127-08-2 |
| Potassium aluminum silicate, anhydrous | Potassium aluminum silicate, anhydrous | 1327-44-2 |
| Potassium benzoate | Benzoic acid, potassium salt | 582-25-2 |
| Potassium bicarbonate | Carbonic acid, monopotassium salt | 298-14-6 |
| Potassium chloride | Potassium chloride | 7447-40-7 |
| Potassium citrate | Citric acid, potassium salt | 7778-49-6 |
| Potassium humate | Humic acids, potassium salts | 68514-28-3 |
| Potassium myristate | Tetradecanoic acid, potassium salt | 13429-27-1 |
| Potassium oleate | 9-Octadecenoic acid (9Z)-, potassium salt | 143-18-0 |
| Potassium ricinoleate | 9-Octadecenoic acid, 12-hydroxy-, monopotassium salt, (9Z,12R)- | 7492-30-0 |
| Potassium sorbate | Sorbic acid, potassium salt | 24634-61-5 |
| Potassium stearate | Octadecanoic acid, potassium salt | 593-29-3 |
| Potassium sulfate | Potassium sulfate | 7778-80-5 |
| Potassium sulfate | Sulfuric acid, monopotassium salt | 7646-93-7 |
| 1,2-Propylene carbonate | 1,3-Dioxolan-2-one, 4-methyl- | 108-32-7 |
| Pumice | Pumice | 1332-09-8 |
| Red cabbage color | Red cabbage color (expressed from edible red cabbage heads via a pressing process using only acidified water) | N/A |
| Red cedar chips | Red cedar chips | N/A |
| Red dog flour | Red dog flour | N/A |
| Rubber | Rubber | 9006-04-6 |
| Sawdust | Sawdust | N/A |
| Shale | Shale | N/A |
| Silica, amorphous, fumed | Silica, amorphous, fumed (crystalline free) | 112945-52-5 |
| Silica, amorphous, precipitate and gel | Silica, amorphous, precipitate and gel | 7699-41-4 |
| Silica | Silica (crystalline free) | 7631-86-9 |
| Silica gel | Silica gel | 63231-67-4 |
| Silica gel, precipitated, crystalline-free | Silica gel, precipitated, crystalline- free | 112926-00-8 |
| Silica, hydrate | Silica, hydrate | 10279-57-9 |
| Silica, vitreous | Silica, vitreous | 60676-86-0 |
| Silicic acid, magnesium salt | Silicic acid ($H_2SiO_3$), magnesium salt | 13776-74-4 |
| Soap | Soap (The water soluble sodium or (1 1) potassium salts of fatty acids produced by either the saponification of fats and oils, or the neutralization of fatty acid) | N/A |
| Soapbark | Quillaja saponin | 1393-03-9 |
| Soapstone | Soapstone | 308076-02-0 |
| Sodium acetate | Acetic acid, sodium salt | 127-09-3 |
| Sodium alginate | Sodium alginate | 9005-38-3 |
| Sodium benzoate | Benzoic acid, sodium salt | 532-32-1 |
| Sodium bicarbonate | Sodium bicarbonate | 144-55-8 |
| Sodium carboxymethyl cellulose | Cellulose, carboxymethyl ether, sodium salt | 9004-32-4 |
| Sodium chloride | Sodium chloride | 7647-14-5 |
| Sodium citrate | Sodium citrate | 994-36-5 |
| Sodium humate | Humic acids, sodium salts | 68131-04-4 |
| Sodium oleate | Sodium oleate | 143-19-1 |
| Sodium ricinoleate | 9-Octadecenoic acid, 12-hydroxy-, monosodium salt, (9Z,12R)- | 5323-95-5 |
| Sodium stearate | Octadecanoic acid, sodium salt | 822-16-2 |
| Sodium sulfate | Sodium sulfate | 7757-82-6 |

TABLE 1-continued

| Inert List | | |
| --- | --- | --- |
| Label Display Name | Chemical Name | CAS No. |
| Sorbitol | D-glucitol | 50-70-4 |
| Soy protein | Soy protein | N/A |
| Soya lecithins | Lecithins, soya | 8030-76-0 |
| Soybean hulls | Soybean hulls | N/A |
| Soybean meal | Soybean meal | 68308-36-1 |
| Soybean, flour | Soybean, flour | 68513-95-1 |
| Stearic acid | Octadecanoic acid | 57-11-4 |
| Sulfur | Sulfur | 7704-34-9 |
| Syrups, hydrolyzed starch, hydrogenated | Syrups, hydrolyzed starch, hydrogenated | 68425-17-2 |
| Tetraglyceryl monooleate | 9-Octadecenoic acid (9Z)-, monoester with tetraglycerol | 71012-10-7 |
| Tricalcium citrate | Citric acid, calcium salt (2:3) | 813-94-5 |
| Triethyl citrate | Citric acid, triethyl ester | 77-93-0 |
| Tripotassium citrate | Citric acid, tripotassium salt | 866-84-2 |
| Tripotassium citrate monohydrate | Citric acid, tripotassium salt, monohydrate | 6100-05-6 |
| Trisodium citrate | Citric acid, trisodium salt | 68-04-2 |
| Trisodium citrate dehydrate | Citric acid, trisodium salt, dehydrate | 6132-04-3 |
| Trisodium citrate pentahydrate | Citric acid, trisodium salt, pentahydrate | 6858-44-2 |
| Ultramarine blue | C.I. Pigment Blue 29 | 57455-37-5 |
| Urea | Urea | 57-13-6 |
| Vanillin | Benzaldehyde, 4-hydroxy-3-methoxy- | 121-33-5 |
| Vermiculite | Vermiculite | 1318-00-9 |
| Vinegar | Vinegar (maximum 8% by weight acetic acid in solution) | 8028-52-2 |
| Vitamin C | E-Ascorbic acid | 50-81-7 |
| Vitamin E | Vitamin E | 1406-18-4 |
| Walnut flour | Walnut flour | N/A |
| Walnut shells | Walnut shells | N/A |
| Wheat | Wheat | N/A |
| Wheat flour | Wheat flour | N/A |
| Wheat germ oil | Wheat germ oil | 8006-95-9 |
| Wheat oil | Oils, wheat | 68917-73-7 |
| Whey | Whey | 92129-90-3 |
| White mineral oil | White mineral oil (petroleum) | 8042-47-5 |
| Wintergreen oil | Wintergreen oil | 68917-75-9 |
| Wollastonite | Wollastonite $(Ca(SiO_3))$ | 13983-17-0 |
| Wool | Wool | N/A |
| Xanthan gum | Xanthan gum | 11138-66-2 |
| Yeast | Yeast | 68876-77-7 |
| Zeolites | Zeolites (excluding erionite (CAS Reg. No. 66733-21-9)) | 1318-02-1 |
| Zeolites, NaA | Zeolites, NaA | 68989-22-0 |
| Zinc iron oxide | Zinc iron oxide | 12063-19-3 |
| Zinc oxide | Zinc oxide (ZnO) | 1314-13-2 |
| Zinc stearate | Octadecanoic acid, zinc salt | 557-05-1 |

In an aspect, the compositions disclosed herein may be used in combination with colorants. It is possible to use colorants such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc.

Figure 1B:
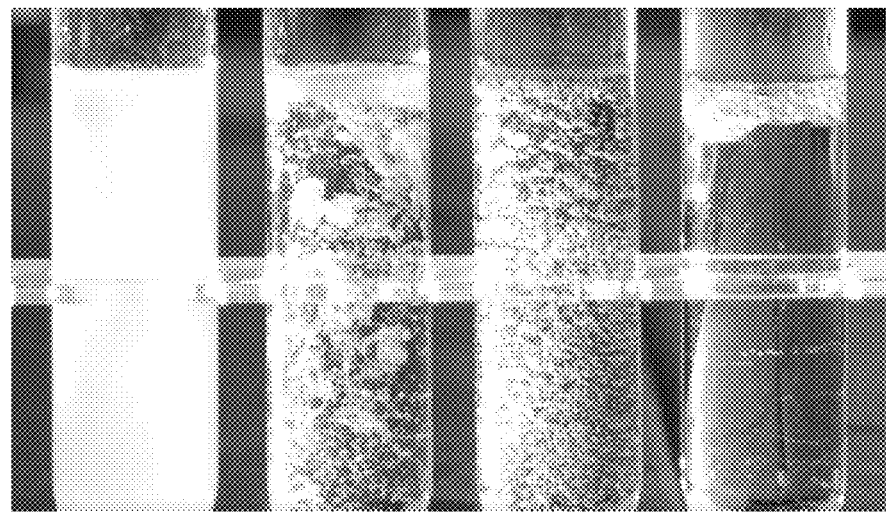
Figure 2:
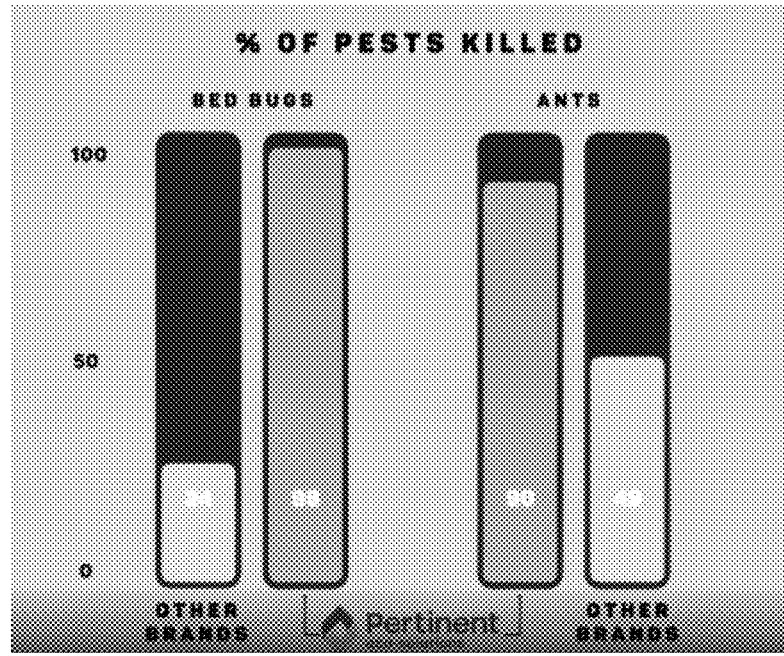
FIG. 2 displays efficacy of the current invention compared to other brands.
Figure 3A:
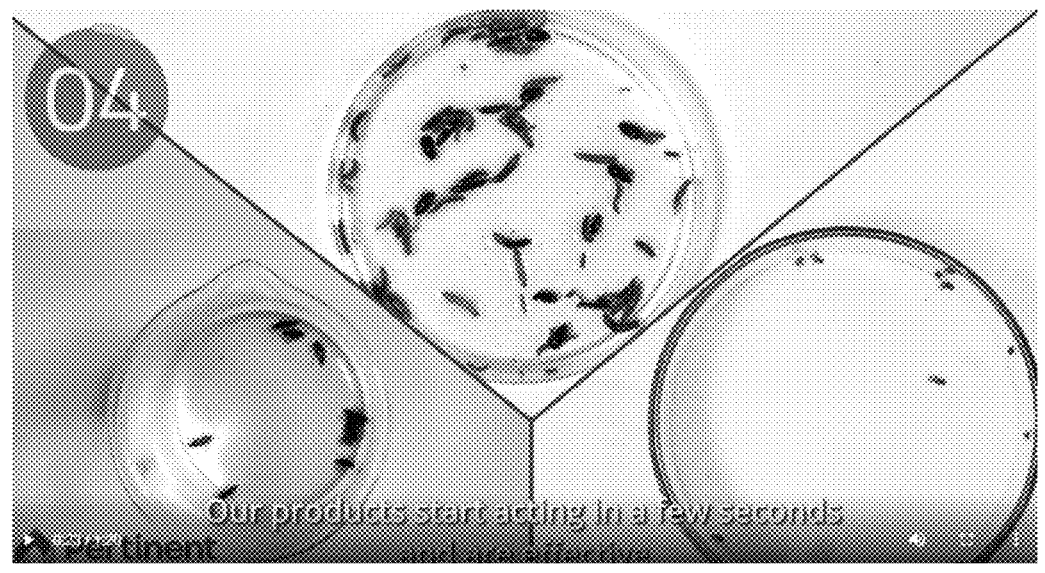
FIGS. 3A-3B depict pests at initial contact (FIG. 3A) and following a passage of time (FIG. 3B) with the current invention.
Figure 3B:
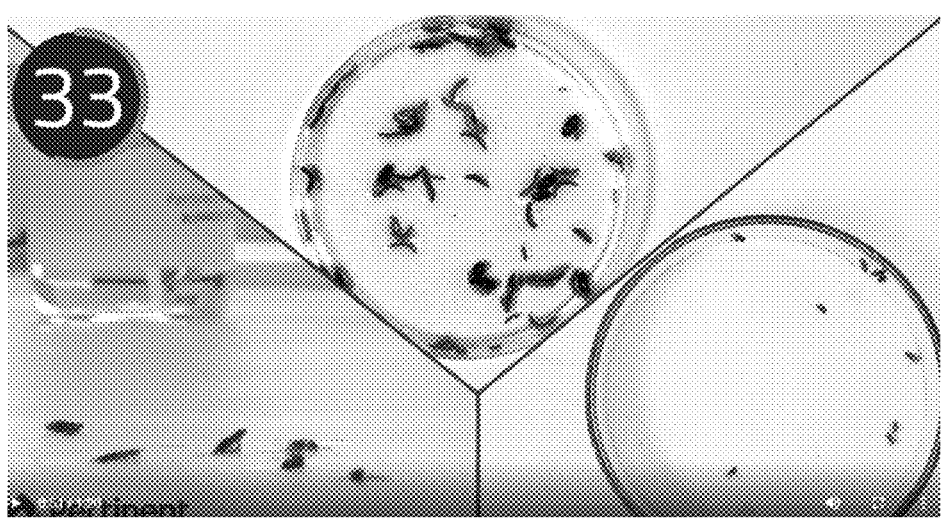

In an aspect, the compositions disclosed herein may be used as insecticides, nematicides, anthemlminthics, repellents, and parasiticides for pests, as described herein. In additional aspects, the compositions disclosed herein may provide antimicrobial uses including, but not limited to, bactericides, antibacterials, antivirals, antifungals, and herbicides. In such aspects, the compositions disclosed herein are effective in controlling pests, as described herein, in humans, animals, and crops. The components of the compositions disclosed herein can have an additive effect. The components of the compositions disclosed herein may further relate to a synergistic effect, wherein the combination of components within compositions of the present disclosure comprise synergistic effects with regards to the above disclosed uses. In such aspects, controlling pests in humans, animals, and crops comprises repelling, killing, and/or resisting one or more pests. The components of compositions disclosed herein may also comprise additive and synergistic effects concerning miscibility and stability of a composition. In such aspects, a combination of components may allow a composition to maintain a homogeneous solution for extended periods of time, as shown in FIGS. 1A-1B. Extended periods of time may comprise time spans necessary for storage and use of compositions disclosed herein including, but not limited to, about 4 hours up to about 1 week. Maintenance of a homogeneous solution may result in improved performance of compositions disclosed herein compared to expected results, as shown in FIG. 2 and FIGS. 3A-3B. Compositions with enhanced homogeneity and stability may comprise emulsifiers, surfactants, solvents, and combinations thereof, as described in the current disclosure.

In aspects of the invention, the choice of components to be included in an exemplary composition is dependent on the application and its accompanying factors. Such factors may include, but are not limited to, presence of crops or other plants, humans, and/or animals in the application area, species of pest to be controlled, quantity of pests to be controlled, and other such factors. In more extreme applications (e.g. no plants, humans, and/or animals in area with large number of pests), a composition using a higher concentration of active ingredients (e.g. essential oils, etc.) may be used. In applications requiring more caution (e.g. crops, humans, and/or animals in the area with low number of pests), compositions utilizing a higher concentration of non-active ingredients (e.g. inert ingredients) may be used.

B. Methods of Use of Compositions Comprising Essential Oils

Also provided herein are methods of repelling, killing and/or resisting one or more pests, as described herein. In such aspects, it is to be appreciated that the compositions as described above are capable of repelling, killing, and/or resisting pests in any life stage of the pests (i.e. egg, larva, pupa, and adult stages). Such methods can in some embodiments include providing a biocide, pesticide, or parasiticide composition comprising essential oils of any of the above disclosed subject matter, and administering the biocide, pesticide, or parasiticide composition to a subject or location in need of treatment. In other aspects, methods can include providing insecticides, nematicides, anthelminthics, repellents, and parasiticides for pests, as described herein. In additional aspects, the compositions disclosed herein may provide antimicrobial uses including, but not limited to, bactericides, antibacterials, antivirals, antifungals, and herbicides. In such aspects, the compositions disclosed herein are effective in controlling pests in humans, animals, and crops. In such aspects, controlling pests in humans, animals, and crops comprises repelling, killing, and/or resisting one or more pests. In some aspects, a biocide, pesticide, or parasiticide is administered through a feed or foodstuff consumed by the subject, optionally a human or animal. In additional aspects, a biocide, pesticide, or parasiticide composition comprising essential oils may be administered through a variety of means known in the art including, but not limited to, sprinkler or misting systems, spray bottles, misters, foggers, backpack sprayers, truck-mounted sprayers, towed sprayers, trailer-mounted sprayers, handheld sprayers, aerial sprayers, oilers, rubs, and other such methods known in the art.

In an aspect of the invention, the compositions as described above may exhibit a selectivity for pests including but not limited to arthropods (e.g., insects, arachnids, and other such arthropods), internal and external parasites (e.g., nematodes, helminths, protozoa, and other such parasites), and a variety of other pests known in the art that does not apply to humans and other animals. Moreover, the compositions described herein are not toxic to humans and other animals. This can be attributed to the method of functionality of the compositions described herein. The compositions of the current invention first dissolve the exoskeleton of a target pest before then targeting hormone receptors present in the pest to effectively repel, kill, control, and/or resist the pest. The compositions also act by binding to biochemical receptors in the pest. Importantly, the receptors targeted by the compositions are not present in humans or other animals, or are present in a lesser extent or different form than in pests targeted by the compositions disclosed herein. This effect decreases the toxicity of the current invention in view of pesticides currently on the market.

Also provided herein are methods of treating locations inhabited or used by people or animals, the methods comprising providing a composition of any of the above subject matter, and applying the composition in, on, around or near the locations to be treated, whereby pests in or near the premises are repelled and/or killed. Such locations to be treated include but are not limited to homes, apartment buildings, bakeries, beverage plants, bottling facilities, breweries, cafeterias, candy plants, canneries, cereal processing and manufacturing plants, dairy barns, poultry facilities, stock yards, flour mills, food processing plants, frozen food plants, homes, hospitals, hotels, houses, industrial buildings, kennels, kitchens, laboratories, manufacturing facilities, mausoleums, meat processing and packaging plants, meat and vegetable canneries, motels, nursing homes, office buildings, restaurants, schools, stores, supermarkets, warehouses and similar structures, building foundations, dairy facilities, drive-in restaurants, drive-in theaters, golf courses, parks, playgrounds, poultry houses, recreational areas, schools, urban areas, lawns, landscape areas, trees, turf, areas around bodies of water, zoos, and other such locations.

C. Pests to be Repelled, Killed, and/or Resisted

In an aspect, compositions of the present disclosure are used to repel, kill, and/or resist one or more pests. In such aspects, pests may include but are not limited to arthropods (e.g., insects, arachnids, and other such arthropods), internal and external parasites (e.g., nematodes, helminths, protozoa, and other such parasites), and a variety of other pests known in the art affecting crops, humans, and/or animals. Non-limiting examples of pests that can be repelled, killed, and/or resisted through administration of one or more compositions disclosed herein are provided below. The below lists are to be understood by one of skill in the art to not be all inclusive. Instead, one of skill in the art will appreciate the wide variety of pests that could be treated and that the following merely provides a non-limiting set of examples.

i. Exemplary Arthropods, Internal and External Parasites, and Other Pests

In an aspect, compositions of the present disclosure are used to repel, kill, and/or resist one or more arthropods, internal and external parasites, and a variety of other pests known in the art affecting crops, humans, and/or animals. Arthropods include any insects (e.g., flies, fleas, ticks, and the like), myriapods (e.g., centipedes, millipedes, and the like), arachnids (e.g., spiders, mites, scorpions, and the like), and crustaceans (e.g. slaters, crabs, and the like). Internal and external parasites include but are not limited to nematodes, ectoparasites, helminths, protozoa, and other such parasites. Lists of exemplary pests, as described above, are provided below. One of skill in the art will appreciate the wide variety of arthropods, internal and external parasites, and other pests and understand that the following lists serve merely as examples.

From the order of the Siphonaptera, for example, *Ctenocephalides felis, Ctenocephalides canis, Pulex irritans, Spilopsyllus cuniculi, Tunga penetrans*, and *Xenopsylla cheopis*.

From the order of the *Acari*, for example, *Rhipicephalus sanguineus, Ixodes pacificus, Ixodes scapularis, Amblyomma americanum, Amblyomma maculatum, Dermatocentor andersoni, Dermatocentor variabilis, Haemaphysalis chordeilis*, and *Boophilus annulatus*. From the order of the Isopoda, for example, *Oniscus asellus, Armadillidium vulgare* and *Porecellio scaber*. From the order of the Diplopoda, for example, *Blaniulus guttulatus*. From the order of the Chilopoda, for example, *Geophilus carpophagus* and *Scutigera* spec. From the order of the Thysanura, for example, *Lepisma saccharina*. From the order of the Collembola, for example, *Onychiurus armatus*. From the order of the Orthoptera, for example, *Scapteriscus* spp. such as *Scapteriscus abbreviatus, Scapteriscus acletus, Scapteriscus borellii, Scapteriscus didactylus*, and *Scapteriscus vicinus, Neocurtilla hexadactyla, Blatta orientalis, Periplaneta americana, Leucophaea maderae, Blattella germanica, Acheta domesticus, Gryllotalpa* spp., *Locusta migratoria* migratorioides, *Melanoplus differentialis* and *Schistocerca gregaria*. From the order of the Dermaptera, for example, *Forficula auricularia*. From the order of the Isoptera, for example *Reticulitermes* spp. From the order of the Mallophaga, for example, *Trichodectes* spp. and *Damalinea* spp. From the order of the Thysanoptera, for example, *Hercinothrips femoralis* and *Thrips tabaci*. From the order of the Heteroptera, for example, *Eurygaster* spp., *Dysdercus intermedius, Piesma quadrata, Cimex lectularius, Rhodnius prolixus* and *Triatoma* spp. From the order of the Homoptera, for example, *Aleurodes brassicae, Bemisia tabaci, Trialeurodes vaporariorum, Aphis gossypii, Brevicoryne brassicae, Cryptomyzus ribis, Aphis fabae, Doralis pomi, Eriosoma lanigerum, Hyalopterus arundinis, Macrosiphum avenae, Myzus* spp., *Phorodon humuli, Rhopalosiphum padi, Empoasca* spp., *Euscelis bilobatus, Nephotettix cincticeps, Lecanium corni, Saissetia oleae, Laodelphax striatellus, Nilaparvata lugens, Aonidiella aurantii, Aspidiotus hederae, Pseudococcus* spp. and *Psylla* spp. From the order of the Lepidoptera, for example, *Pectinophora gossypiella, Bupalus piniarius, Cheimatobia brumata, Lithocolletis blancardella, Hyponomeuta padella, Plutella maculipennis, Malacosoma neustria, Euproctis chrysorrhoea, Lymantria* spp., *Bucculatrix thurberiella, Phyllocnistis citrella, Agrotis* spp., *Spodoptera exigua, Mamestra brassicae, Panolis flammea, Prodenia litura, Spodoptera* spp., *Trichoplusiani, Carpocapsa pomonella, Pieris* spp., *Chilo* spp., *Pyrausta nubilalis, Ephestia kuehniella, Galleria mellonella, Tineola bisselliella, Tinea pellionella, Hofinannophila pseudospretella, Cacoecia podana, Capua reticulana, Choristoneura fumiferana, Clysia ambiguella, Homona magnanima* and *Tortrix viridana*. From the order of the Coleoptera, for example, *Anobium punctatum, Rhizopertha dominica, Acanthoscelides obtectus, Acanthoscelides obtectus, Hylotrupes bajulus, Agelastica alni, Leptinotarsa decemlineata, Phaedon cochleariae, Diabrotica* spp., *Psylliodes chrysocephala, Epilachna varivestis, Atomaria* spp., *Oryzaephilus surinamensis, Anthonomus* spp., *Sitophilus* spp., *Otiorrhynchus sulcatus, Cosmopolites sordidus, Ceuthorrhynchus assimilis, Hypera postica, Dermestes* spp., *Trogoderma* spp., *Anthrenus* spp., *Attagenus* spp., *Lyctus* spp., *Meligethes aeneus, Ptinus* spp., *Niptus hololeucus, Gibbium psylloides, Tribolium* spp., *Tenebrio molitor, Agriotes* spp., *Conoderus* spp., *Melolontha melolontha, Amphimallon solstitialis* and *Costelytra zealandica*. From the order of the Hymenoptera, for example, *Diprion* spp., *Hoplocampa* spp., *Lasius* spp., *Monomorium pharaonis* and *Vespa* spp. From the order of the Diptera, for example, *Aedes* spp., *Anopheles* spp., *Culex* spp., *Drosophila melanogaster, Musca* spp., *Fannia* spp., *Calliphora erythrocephala, Lucilia* spp., *Chrysomyia* spp., *Cuterebra* spp., *Gastrophilus* spp., *Hyppobosca* spp., *Stomoxys* spp., *Oestrus* spp., *Hypoderma* spp., *Tanaus* spp., *Tannia* spp., *Bibio hortulanus, Oscinella fit, Phorbia* spp., *Pegomyia hyoscyami, Ceratitis capitata, Dacus oleae* and *Tipula paludosa*.

In an aspect, there is provided a method for the control of arthropod, internal and external parasites, and other pests at a location, which comprises the treatment of the location (e.g., by application or administration) with an effective amount of one or more compositions described herein.

Compositions described herein may be used in the fields of agriculture, veterinary medicine, livestock husbandry, and maintenance of public health against pests including but not limited to arthropods, helminths or protozoa which are parasitic internally or externally upon vertebrates, for example man and domestic animals (e.g., cattle, sheep, goats, equines, swine, poultry, dogs, cats and fishes). Such exemplary pests include, but are not limited to, Acarina, including ticks (e.g. *Ixodes* spp., *Boophilus* spp., *Boophilus microplus, Amblyomma* spp., *Hyalomma* spp., *Rhipicephalus* spp. (e.g. *Rhipicephalus appendiculatus*), *Haemaphysalis* spp., *Dermacentor* spp., *Ornithodorus* spp. (e.g. *Ornithodorus moubata*)) and mites (e.g. *Damalinia* spp., *Dermahyssus gallinae, Sarcoptes* spp. e.g. *Sarcoptes scabiei, Psoroptes* spp., *Chorioptes* spp., *Demodex* spp., *Eutrombicula* spp.); Diptera (e.g. *Aedes* spp., *Anopheles* spp., *Musca* spp., *Hypoderma* spp., *Gasterophilus* spp., *Simulium* spp.); Hemiptera (e.g. *Triatoma* spp.); Phthiraptera (e.g. *Damalinia* spp., *Linognathus* spp.); Siphonaptera (e.g. *Ctenocephalides* spp.); Dictyoptera (e.g. *Periplaneta* spp., *Blatella* spp.); Hymenoptera (e.g. *Monomorium pharaonis*). Such exemplary pests further include, but are not limited to, parasitic nematode worms causing infections of the gastro-intestinal tract, such as members of the family Trichostrongylidae, *Nippostrongylus brasiliensis, Trichinella spiralis, Haemonchus contortus, Trichostrongylus colubriformis, Nematodirus battus, Ostertagia circumcincta, Trichostrongylus axei, Cooperia* spp. and *Hymenolepis nana*. Such exemplary pests further include, but are not limited to, protozoa causing protozoal diseases, such as *Eimeria* spp. e.g. *Eimeria tenella, Eimeria acervulina, Eimeria brunetti, Eimeria maxima* and *Eimeria necatrix, Trypanosoma cruzi, Leishmania* spp., *Plasmodium* spp., *Babesia* spp., *Trichomonadidae* spp., *Histomonas* spp., *Giardia* spp., *Toxoplasma* spp., *Entamoeba histolytica* and *Theileria* spp. Such exemplary pests further include, but are not limited to, arthropods that may damage stored products, such as cereals, including grain and flour, groundnuts, animal feedstuffs, timber and household goods (e.g. carpets and textiles), and the like. Such arthropods include, but are not limited to, beetles, including weevils, moths and mites, such as *Ephestia* spp. (flour moths), *Anthrenus* spp. (carpet beetles), *Tribolium* spp. (flour beetles), *Sitophilus* spp. (grain weevils) and *Acarus* spp. (mites). Additional arthropods include cockroaches, ants and termites and similar arthropod pests that may infest domestic and industrial premises and mosquitoes in various life stages, such as larvae in waterways, wells, reservoirs or other running or standing water. The compositions disclosed herein may also be used for the treatment of foundations, structure and soil in the prevention of the attack on buildings by termites, such as *Reticulitermes* spp., *Heterotermes* spp., *Coptotermes* spp. The compositions disclosed herein may also be used in agriculture, against adults, larvae and eggs of Lepidoptera (butterflies and moths), e.g. *Heliothis* spp. such as *Heliothis virescens* (tobacco budworm), *Heliothis armigera* and *Heliothis zea, Spodoptera* spp. such as *S. exempta, S. littoralis* (Egyptian cotton worm), *S. eridania* (southern army worm), *Mamestra configurata* (bertha army worm); *Earias* spp. e.g. *E. insulana* (Egyptian bollworm), *Pectinophora* spp. e.g. *Pectinophora gossypiella* (pink bollworm), *Ostrinia* spp. such as *O. nubilalis* (European cornborer), *Trichoplusia ni* (cabbage looper), *Pieris* spp. (cabbage worms), *Laphygma* spp. (army worms), *Agrotis* and *Amathes* spp. (cutworms), *Wiseana* spp. (porina moth), *Chilo* spp. (rice stem borer), *Tryporyza* spp. and *Diatraea* spp. (sugar cane borers and rice borers), *Sparganothis pilleriana* (grape berry moth), *Cydia pomo-*

*nella* (codling moth), *Archips* spp. (fruit tree *tortrix* moths), *Plutella xylostella* (diamond back moth); against adult and larvae of Coleoptera (beetles) e.g. *Hypothenemus hampei* (coffee berry borer), *Hylesinus* spp. (bark beetles), *Anthonomus grandis* (cotton boll weevil), *Acalymma* spp. (cucumber beetles), *Lema* spp., *Psylliodes* spp., *Leptinotarsa decemlineata* (Colorado potato beetle), *Diabrotica* spp. (corn rootworms), *Gonocephalum* spp. (false wire worms), *Agriotes* spp. (wireworms), *Dermolepida* and *Heteronychus* spp. (white grubs), *Phaedon cochleariae* (mustard beetle), *Lissorhoptrus oryzophilus* (rice water weevil), *Meligethes* spp. (pollen beetles), *Ceutorhynchus* spp., *Rhynchophorus* and *Cosmopolites* spp. (root weevils); against Hemiptera e.g. *Psylla* spp., *Bemisia* spp., *Trialeurodes* spp., *Aphis* spp., *Myzus* spp., *Megoura viciae*, *Phylloxera* spp., *Adelges* spp., *Phorodon humuli* (hop damson aphid), *Aeneolamia* spp., *Nephotettix* spp. (rice leaf hoppers), *Empoasca* spp., *Nilaparvata* spp., *Perkinsiella* spp., *Pyrilla* spp., *Aonidiella* spp. (red scales), *Coccus* spp., *Pseudococcus* spp., *Helopeltis* spp. (mosquito bugs), *Lygus* spp., *Dysdercus* spp., *Oxycarenus* spp., *Nezara* spp.; Hymenoptera e.g. *Athalia* spp. and *Cephus* spp. (saw flies), *Atta* spp. (leaf cutting ants); Diptera e.g. *Hylemyia* spp. (root flies), *Atherigona* spp. and *Chlorops* spp. (shoot flies), *Phytomyza* spp. (leaf miners), *Ceratitis* spp. (fruit flies); Thysanoptera such as *Thrips tabaci*; Orthoptera such as *Locusta* and *Schistocerca* spp. (locusts) and crickets e.g. *Gryllus* spp. and *Acheta* spp.; Collembola e.g. *Sminthurus* spp. and *Onychiurus* spp. (springtails), Isoptera e.g. *Odontotermes* spp. (termites), Dermaptera e.g. *Forficula* spp. (earwigs) and also other arthropods of agricultural significance such as *Acari* (mites) e.g. *Tetranychus* spp., *Panonychus* spp. and *Bryobia* spp. (spider mites), *Eriophyes* spp. (gall mites), *Polyphagotarsonemus* spp.; *Blaniulus* spp. (millipedes), *Scutigerella* spp. (symphilids), *Oniscus* spp. (woodlice) and *Triops* spp. (crustacea). The compositions disclosed herein may also be used against nematodes, which attack plants and trees of importance to agriculture, forestry, horticulture either directly or by spreading bacterial, viral, mycoplasma or fungal diseases of the plants. Nematodes include, but are not limited to, root-knot nematodes such as *Meloidogyne* spp. (e.g. *M. incognita*); cyst nematodes such as *Globodera* spp. (e.g. *G. rostochiensis*); *Heterodera* spp. (e.g. *H. avenae*); *Radopholus* spp. (e.g. *R. similis*); lesion nematodes such as *Pratylenchus* spp. (e.g. *P. pratensis*); *Belonolaimus* spp. (e.g. *B. gracilis*); *Tylenchulus* spp. (e.g. *T. semipenetrans*); *Rotylenchulus* spp. (e.g. *R. reniformis*); *Rotylenchus* spp. (e.g. *R. robustus*); *Helicotylenchus* spp. (e.g. *H. multicinctus*); *Hemicycliophora* spp. (e.g. *H. gracilis*); *Criconemoides* spp. (e.g. *C. similis*); *Trichodorus* spp. (e.g. *T. primitivus*); dagger nematodes such as *Xiphinema* spp. (e.g. *X. diversicaudatum*), *Longidorus* spp. (e.g. *L. elongatus*); *Hoplolaimus* spp. (e.g. *H. coronatus*); *Aphelenchoides* spp. (e.g. *A. ritzemabosi*, *A. besseyi*); stem and bulb eelworms such as *Ditylenchus* spp. (e.g. *D. dipsaci*).

Additional arthropod pests to be treated by one or more compositions described herein include the following. From the order of the Isopoda, for example, *Oniscus asellus*, *Armadillidium vulgare* and *Porcellio scaber*. From the order of the *Diplopoda*, for example, *Blaniulus guttulatus*. From the order of the Chilopoda, for example, *Geophilus carpophagus* and *Scutigera* spec. From the order of the Symphyla, for example, *Scutigerella immaculata*. From the order of the Thysanura, for example, *Lepisma saccharina*. From the order of the Collembola, for example, *Onychiurus armatus*. From the order of the Orthoptera, for example, *Blatta orientalis*, *Periplaneta americana*, *Leucophaea maderae*,

*Blattella germanica*, *Acheta domesticus*, *Gryllotalpa* spp., *Locusta migratoria* migratorioides, *Melanoplus differentialis* and *Schistocerca gregaria*. From the order of the Dermaptera, for example *Forficula auricularia*. From the order of the Isoptera, for example, *Reticulitermes* spp. From the order of the Anoplura, for example, *Phylloxera vastatrix*, *Pemphigus* spp., *Pediculus humanus corporis*, *Haematopinus* spp. and *Linognathus* spp. From the order of the Mallophaga, for example, *Trichodectes* spp. and *Damalinea* spp. From the order of the Thysanoptera, for example, *Hercinothrips femoralis* and *Thrips tabaci*. From the order of the Heteroptera, for example, *Eurygaster* spp., *Dysdercus intermedius*, *Piesma quadrata*, *Cimex lectularius*, *Rhodnius prolixus* and *Triatoma* spp. From the order of the Homoptera, for example, *Aleurodes brassicae*, *Bemisia tabaci*, *Trialeurodes vaporariorum*, *Aphis gossypii*, *Brevicoryne brassicae*, *Cryptomyzus ribis*, *Doralis fabae*, *Doralis pomi*, *Eriosoma lanigerum*, *Hyalopterus arundinus*, *Macrosiphum avenae*, *Myzus* spp., *Phorodon humuli*, *Rhopalosiphum padi*, *Empoasca* spp., *Euscelis bilobatus*, *Nephotettix cincticeps*, *Lecanium corni*, *Saissetia oleae*, *Laodelphax striatellus*, *Nilaparvata lugens*, *Aonidiella aurantii*, *Aspidiotus hederae*, *Pseudococcus* spp. and *Psylla* spp. From the order of the Lepidoptera, for example, *Pectinophora gossypiella*, *Bupalus piniarius*, *Cheimatobia brumata*, *Lithocolletis blancardella*, *Hyponomeuta padella*, *Plutella maculipennis*, *Malacosoma neustria*, *Euproctis chrysorrhoea*, *Lymantria* spp. *Bucculatrix thurberiella*, *Phyllocnistis citrella*, *Agrotis* spp., *Euxoa* spp., *Feltia* spp., *Earias insulana*, *Heliothis* spp., *Laphygma exigua*, *Mamestra brassicae*, *Panolis flammea*, *Prodenia litura*, *Spodoptera* spp., *Trichoplusia ni*, *Carpocapsa pomonella*, *Pieris* spp., *Chilo* spp., *Pyrausta nubilalis*, *Ephestia kuehniella*, *Galleria mellonella*, *Tineola bisselliella*, *Tinea pellionella*, *Hofmannophila pseudospretella*, *Cacoecia podana*, *Capua reticulana*, *Choristoneura fumiferana*, *Clysia ambiguella*, *Homona magnanima* and *Tortrix viridana*. From the order of the Coleoptera, for example, *Anobium punctatum*, *Rhizopertha dominica*, *Bruchidius obtectus*, *Acanthoscelides obtectus*, *Hylotrupes bajulus*, *Agelastica alni*, *Leptinotarsa decemlineata*, *Phaedon cochleariae*, *Diabrotica* spp., *Psylliodes chrysocephala*, *Epilachna varivestis*, *Atomaria* spp., *Oryzaephilus surinamensis*, *Anthonomus* spp., *Sitophilus* spp., *Otiorrhynchus sulcatus*, *Cosmopolites sordidus*, *Ceuthorrhynchus assimilis*, *Hypera postica*, *Dermestes* spp., *Trogoderma* spp., *Anthrenus* spp., *Attagenus* spp., *Lyctus* spp., *Meligethes aeneus*, *Ptinus* spp., *Niptus hololeucus*, *Gibbium psylloides*, *Tribolium* spp., *Tenebrio molitor*, *Agriotes* spp., *Conoderus* spp., *Melolontha melolontha*, *Amphimallon solstitialis* and *Costelytra zealandica*. From the order of the Hymenoptera, for example, *Diprion* spp., *Hoplocampa* spp., *Lasium* spp., *Monomorium pharaonis* and *Vespa* spp. From the order of the Diptera, for example, *Aedes* spp., *Anopheles* spp., *Culex* spp., *Drosophila melanogaster*, *Musca* spp., *Fannia* spp., *Calliphora erythrocephala*, *Lucilia* spp., *Chrysomyia* spp., *Cuterebra* spp., *Gastrophilus* spp., *Hyppobosca* spp., *Stomoxys* spp., *Oestrus* spp., *Hypoderma* spp., *Tabanus* spp., *Tannia* spp., *Bibio hortulanus*, *Oscinella frit*, *Phorbia* spp., *Pegomyia hyoscyami*, *Ceratitis capitata*, *Dacus oleae* and *Tipula paludosa*. From the order of the Siphonaptera, for example, *Xenopsylla cheopis* and *Ceratophyllus* spp. From the order of the Arachnida, for example, *Scorpio maurus* and *Latrodectus mactans*.

The compositions described herein can be used against internal and external parasites. As a non-limiting example, Coccidiosis, a disease caused by infections by protozoan parasites of the genus *Eimeria*, is an important potential cause of economic loss in domestic animals and birds, particularly those raised or kept under intensive conditions. For example, cattle, sheep, pigs and rabbits may be affected, but the disease is especially important in poultry, in particular chickens. The poultry disease is generally spread by the birds picking up the infectious organism in droppings on contaminated litter or ground or by way of food or drinking water. The disease is manifested by hemorrhage, accumulation of blood in the ceca, passage of blood to the droppings, weakness and digestive disturbances. The disease often terminates in the death of the animal but the fowl which survive severe infections have had their market value substantially reduced as a result of the infection. Administration of a compositions described herein, preferably by combination with poultry feed, is effective in repelling, killing, and/or controlling the internal parasites causing coccidiosis. The compositions are effective against both the cecal form (caused by *E. tenella*) and the intestinal forms (principally caused by *E. acervulina, E. brunetti, E. maxima* and *E. necatrix*).

As previously discussed, the above examples of pests are non-limiting. The compositions disclosed herein are effective in repelling, killing, and/or controlling a large variety of pests known in the art. The above is merely provided to partially illuminate the large variety.

D. Subjects to be Administered Compositions

In some embodiments, compositions as described herein may be administered to a subject in need thereof. In such an aspect, a subject to be treated or administered a disclosed composition is desirably a vertebrate, although it is to be understood that the principles of the disclosed subject matter indicate that the compositions and methods are effective with respect to invertebrate and to all vertebrate species, including mammals, such as domestic animals, livestock animals, companion animals, rodents, etc., which are intended to be included in the term "subject". Moreover, a mammal is understood to include any mammalian species in which treatment is desirable, particularly agricultural and domestic mammalian species. In such aspects, a composition, as described above, may be administered to a subject to control pests that may affect the subject. In such aspects, the pests may be arthropods, helminths, and/or internal parasites. Pests may affect the subject externally or internally.

The disclosed methods and treatments are particularly useful in the treatment of warm-blooded vertebrates. Thus, the presently disclosed subject matter concerns mammals and birds. In such aspects, an exemplary method of treatment may utilize combining a composition comprising an essential oil, as described above, with a food or foodstuff to then be consumed by the subject, though other methods of treatment may be utilized, as known in the art.

More particularly, provided herein is the treatment of mammals such as humans, as well as those mammals of importance due to being laboratory animals for modeling human diseases and conditions (such as mice, rats and pigs), endangered (such as Siberian tigers), of economic importance (animals raised on farms for consumption by humans), and/or social importance (animals kept as pets or in zoos) to humans, for instance, carnivores other than humans (such as cats and dogs), swine (pigs, hogs, and wild boars), ruminants (such as cattle, oxen, sheep, giraffes, deer, goats, bison, and camels), and horses. Also provided is the treatment of birds, including the treatment of those kinds of birds that are endangered, kept in zoos, as well as fowl, and more particularly domesticated fowl, i.e., poultry, such as turkeys, chickens, ducks, geese, guinea fowl, and the like, as they are also of economic importance to humans. Also provided is the treatment of fish, including fish in commercial aquaculture operations, as well as ornamental fish in home, professional, and commercial aquaria.

Also of particular interest are the treatment of premises inhabited or used by people, crops, or animals. These include homes, apartment buildings, bakeries, beverage plants, bottling facilities, breweries, cafeterias, candy plants, canneries, cereal processing and manufacturing plants, dairy barns, poultry facilities, stock yards, flour mills, food processing plants, frozen food plants, homes, hospitals, hotels, houses, industrial buildings, kennels, kitchens, laboratories, manufacturing facilities, mausoleums, meat processing and packaging plants, meat and vegetable canneries, motels, nursing homes, office buildings, restaurants, schools, stores, supermarkets, warehouses and similar structures, building foundations, dairy facilities, drive-in restaurants, drive-in theaters, golf courses, parks, playgrounds, poultry houses, recreational areas, schools, urban areas, lawns, landscape areas, trees, turf, areas around bodies of water, and zoos.

In an aspect, premises inhabited by crops relate to agriculture. In such an aspect, protection of agricultural premises may further relate to the treatment of crops and premises including, but not limited to, field, forage, plantation, glasshouse, orchard and vineyard crops, of ornamentals and of plantation and forest trees, for example, cereals (such as maize, wheat, rice, sorghum), cotton, tobacco, vegetables and salads (such as beans, cole crops, curcurbits, lettuce, onions, tomatoes and peppers), field crops (such as potato, sugar beet, ground nuts, soyabean, oil seed rape), sugar cane, grassland and forage (such as maize, sorghum, lucerne), plantations (such as of tea, coffee, cocoa, banana, oil palm, coconut, rubber, spices), orchards and groves (such as of stone and pip fruit, citrus, kiwifruit, avocado, mango, olives and walnuts), vineyards, ornamental plants, flowers and shrubs under glass and in gardens and parks, forest trees (both deciduous and evergreen) in forests, plantations, nurseries, and the like. The compositions described herein are also valuable in the protection of timber (standing, felled, converted, stored or structural) from attack by sawflies (e.g. Urocerus) or beetles (e.g. scolytids, platypodids, lyctids, bostrychids, cerambycids, anobiids), or termites, for example, *Reticulitermes* spp., *Heterotermes* spp., *Coptotermes* spp., and other such pests known in the art and described herein. They have applications in the protection of stored products such as grains, fruits, nuts, spices and tobacco, whether whole, milled or compounded into products, from moth, beetle and mite attack. Also protected are stored animal products such as skins, hair, wool and feathers in natural or converted form (e.g. as carpets or textiles) from moth and beetle attack; also stored meat and fish from beetle, mite and fly attack.

EXAMPLES

Example 1. Exemplary Compositions Synthesized

Provided below in Tables 2-4 are a number of working examples of biocide, or pesticide, or parasiticide compositions according to those described in the above description. Table 3 provides non-limiting examples of exemplary formulas according to aspects of the current disclosure. Tables 2 and 4 provide non-limiting examples of concentrates according to aspects of the current disclosure. Concentrations of components in the above described Tables are given in ranges according to the present disclosure. These examples are not limiting, but rather show a select number of working examples. Those of ordinary skill in the art should, in light of the present disclosure, appreciate that many changes can be made in the specific embodiments which are disclosed and still obtain a like or similar result without departing from the spirit and scope of the presently disclosed subject matter.

TABLE 2

Exemplary Concentrate Formulations

| Example | Essential oil, percentage | | | | | | Additive, percentage | |
|---|---|---|---|---|---|---|---|---|
| 1 | Geraniol | 1-40 | Citronella oil | 1-40 | Cedarwood oil | 1-40 | — | — |
| 2 | Geraniol | 1-40 | Citronella oil | 1-40 | Cedarwood oil | 1-40 | — | — |
| 3 | Geraniol | 1-40 | Citronella oil | 1-40 | Cedarwood oil | 1-40 | — | — |
| 4 | Geraniol | 1-40 | Cornmint oil | 1-40 | Clove oil | 1-40 | — | — |
| 5 | Geraniol | 1-40 | Cornmint oil | 1-40 | Clove oil | 1-40 | — | — |
| 6 | Geraniol | 1-40 | Cornmint oil | 1-40 | Clove oil | 1-40 | — | — |
| 7 | Geraniol | 1-40 | Cornmint oil | 1-40 | Peppermint oil | 1-40 | — | — |
| 8 | Geraniol | 1-40 | Thyme oil | 1-40 | Clove oil | 1-40 | — | — |
| 9 | Geraniol | 1-40 | Citronella oil | 1-40 | Cedarwood oil | 1-40 | — | — |
| 10 | Geraniol | 1-40 | Cornmint oil | 1-40 | Clove oil | 1-40 | — | — |
| 11 | Geraniol | 1-40 | Thyme oil | 1-40 | — | — | Celite | 5-20 |
| 12 | Geraniol | 1-40 | Citronella oil | 1-40 | Eugenol | 1-40 | | |
| 13 | Geraniol | 1-40 | Thyme oil | 1-40 | — | — | Celite | 5-20 |
| 14 | Geraniol | 1-40 | — | — | — | — | — | — |
| 15 | Geraniol | 1-40 | — | — | — | — | — | — |
| 16 | Geraniol | 1-40 | — | — | — | — | — | — |
| 17 | Geraniol | 1-40 | — | — | — | — | — | — |
| 18 | Geraniol | 1-40 | — | — | — | — | — | — |
| 19 | Geraniol | 1-40 | — | — | — | — | — | — |
| 20 | Geraniol | 1-40 | Citronella oil | 1-40 | Eugenol | 1-40 | — | — |
| 21 | Geraniol | 1-40 | Citronella oil | 1-40 | Eugenol | 1-40 | — | — |
| 22 | Geraniol | 1-40 | Citronella oil | 1-40 | Eugenol | 1-40 | — | — |
| 23 | Geraniol | 1-40 | Cornmint oil | 1-40 | Clove oil | 1-40 | — | — |
| 24 | Geraniol | 1-40 | — | — | — | — | — | — |
| 25 | Geraniol | 1-40 | Thymol | 1-40 | Eugenol | 1-40 | — | — |
| 26 | Geraniol | 1-40 | Citronella oil | 1-40 | Cedarwood oil | 1-40 | — | — |
| 26 | Geraniol | 1-40 | Citronella oil | 1-40 | Cedarwood oil | 1-40 | — | — |
| 27 | Geraniol | 1-40 | Cornmint oil | 1-40 | Eugenol | 1-40 | — | — |
| 28 | Geraniol | 1-40 | — | — | — | — | — | — |
| 29 | Geraniol | 1-40 | Citronella oil | 1-40 | Cedarwood oil | 1-40 | — | — |
| 30 | Geraniol | 1-40 | Citronella oil | 1-40 | Cedarwood oil | 1-40 | — | — |
| 31 | Geraniol | 1-40 | Citronella oil | 1-40 | Cedarwood oil | 1-40 | — | — |
| 32 | Geraniol | 1-40 | Citronella oil | 1-40 | Cedarwood oil | 1-40 | — | — |
| 33 | Geraniol | 1-40 | Citronella oil | 1-40 | Cedarwood oil | 1-40 | — | — |
| 34 | Geraniol | 1-40 | Rosemary oil | 1-40 | Thyme oil | 1-40 | — | — |
| 35 | Geraniol | 1-40 | Rosemary oil | 1-40 | Clove oil | 1-40 | — | — |
| 36 | Geraniol | 1-40 | Thyme oil | 1-40 | Cedarwood oil | 1-40 | — | — |
| 37 | Geraniol | 1-40 | Rosemary oil | 1-40 | Cinnamon oil | 1-40 | — | — |
| 38 | Geraniol | 1-55 | Castor oil | 1-55 | Peppermint oil | 1-55 | — | — |
| 39 | Geraniol | 1-55 | Clove oil | 1-55 | Corn oil | 1-55 | — | — |
| 40 | Geraniol | 1-55 | Cottonseed oil | 1-55 | Cornmint oil | 1-55 | — | — |
| 41 | Geraniol | 1-55 | Cornmint oil | 1-55 | Garlic oil | 1-55 | — | — |
| 42 | Geraniol | 1-55 | Linseed oil | 1-55 | Rosemary oil | 1-55 | — | — |
| 43 | Geraniol | 1-55 | Sesame oil | 1-55 | Clove oil | 1-55 | — | — |
| 44 | Geraniol | 1-55 | 2-phenylethyl propionate | 1-55 | Peppermint oil | 1-55 | — | — |
| 45 | Rosemary oil | 1-55 | Thyme oil | 1-55 | Clove oil | 1-55 | — | — |
| 46 | Linseed oil | 1-55 | Citronella oil | 1-55 | Cedarwood oil | 1-55 | — | — |
| 47 | Spearmint oil | 1-55 | Cornmint oil | 1-55 | Clove oil | 1-55 | — | — |
| 48 | Peppermint oil | 1-55 | Thyme oil | 1-55 | — | — | Celite | 5-20 |
| 49 | Thyme oil | 1-55 | Citronella oil | 1-55 | Eugenol | 1-55 | — | — |
| 50 | Garlic oil | 1-55 | Thyme oil | 1-55 | — | — | Celite | 5-20 |

TABLE 2-continued

| | Exemplary Concentrate Formulations | | | | | |
|---|---|---|---|---|---|---|
| Example | Surfactant/Detergent, percentage | | | | Emulsifier, percentage | |
| 1 | Sodium cocoate | 1-20 | Sodium lauryl sulfate | 1-20 | Polyglyceryl oleate | 0.1-10 |
| 2 | Potassium oleate | 1-20 | Sodium lauryl sulfate | 1-20 | Polyglyceryl oleate | 0.1-10 |
| 3 | Potassium salt of $C_8$-$C_{10}$ fatty acids | 1-20 | Sodium lauryl sulfate | 1-20 | Polyglyceryl oleate | 0.1-10 |
| 4 | Sodium cocoate | 1-20 | Sodium lauryl sulfate | 1-20 | Polyglyceryl oleate | 0.1-10 |
| 5 | Potassium oleate | 1-20 | Sodium lauryl sulfate | 1-20 | Polyglyceryl oleate | 0.1-10 |
| 6 | Potassium salt of $C_8$-$C_{10}$ fatty acids | 1-20 | Sodium lauryl sulfate | 1-20 | Polyglyceryl oleate | 0.1-10 |
| 7 | Sodium cocoate | 1-20 | Sodium lauryl sulfate | 1-20 | Polyglyceryl oleate | 0.1-10 |
| 8 | Sodium cocoate | 1-20 | Sodium lauryl sulphate | 1-20 | Polyglyceryl oleate | 0.1-10 |
| 9 | Sodium cocoate | 1-20 | Sodium lauryl sulfate | 1-20 | Polyglyceryl oleate | 0.1-10 |
| 10 | Sodium cocoate | 1-20 | Sodium lauryl sulfate | 1-20 | Polyglyceryl oleate | 0.1-10 |
| 11 | Potassium cocoate | 20-50 | — | — | — | — |
| 12 | Sodium cocoate | 1-20 | Sodium lauryl sulfate | 1-20 | Polyglyceryl oleate | 0.1-10 |
| 13 | Potassium cocoate | 20-50 | — | — | — | — |
| 14 | — | — | — | — | Polyglyceryl oleate | 0.1-10 |
| 15 | — | — | — | — | Polyglyceryl oleate | 0.1-10 |
| 16 | Sodium lauryl sulfate | 1-20 | — | — | Polyglyceryl oleate | 0.1-10 |
| 17 | Sodium lauryl sulfate | 1-20 | — | — | Polyglyceryl oleate | 0.1-10 |
| 18 | Sodium lauryl sulfate | 1-20 | — | — | Polyglyceryl oleate | 0.1-10 |
| 19 | Sodium lauryl sulfate | 1-20 | — | — | Polyglyceryl oleate | 0.1-10 |
| 20 | Sodium cocoate | 1-20 | Sodium lauryl sulfate | 1-20 | Polyglyceryl oleate | 0.1-10 |
| 21 | Sodium cocoate | 1-20 | Sodium lauryl sulfate | 1-20 | Polyglyceryl oleate | 0.1-10 |
| 22 | Sodium cocoate | 1-20 | Sodium lauryl sulfate | 1-20 | Polyglyceryl oleate | 0.1-10 |
| 23 | Sodium cocoate | 1-20 | Sodium lauryl sulfate | 1-20 | Polyglyceryl oleate | 0.1-10 |
| 24 | — | — | — | — | Polyglyceryl oleate | 0.1-10 |
| 25 | Sodium cocoate | 1-20 | Sodium lauryl sulphate | 1-20 | Polyglyceryl oleate | 0.1-10 |
| 26 | Sodium cocoate | 1-20 | — | — | Polyglyceryl oleate | 0.1-10 |
| 26 | Sodium cocoate | 1-20 | Sodium lauryl sulfate | 1-20 | Polyglyceryl oleate | 0.1-10 |
| 27 | Sodium cocoate | 1-20 | Sodium lauryl sulfate | 1-20 | Polyglyceryl oleate | 0.1-10 |
| 28 | — | — | — | — | — | — |
| 29 | Sodium cocoate | 1-20 | Sodium lauryl sulfate | 1-20 | Polyglyceryl stearate | 0.1-10 |
| 30 | Soapbark extract | 1-20 | — | — | Polyglyceryl oleate | 0.1-10 |
| 31 | Sodium cocoate | 1-20 | Sodium lauryl sulfate | 1-20 | Xanthan gum | 0.1-10 |
| 32 | Sodium cocoate | 1-20 | Sodium lauryl sulfate | 1-20 | Carboxymethyl cellulose | 0.1-10 |
| 33 | Sodium cocoate | 1-20 | Sodium lauryl sulfate | 1-20 | Sodium alginate | 0.1-10 |
| 34 | Sodium cocoate | 1-20 | Sodium lauryl sulfate | 1-20 | Polyglyceryl oleate | 0.1-10 |
| 35 | Sodium cocoate | 1-20 | Sodium lauryl sulfate | 1-20 | Polyglyceryl oleate | 0.1-10 |
| 36 | Sodium cocoate | 1-20 | Sodium lauryl sulfate | 1-20 | Polyglyceryl oleate | 0.1-10 |
| 37 | Sodium cocoate | 1-20 | Sodium lauryl sulfate | 1-20 | Polyglyceryl oleate | 0.1-10 |
| 38 | Sodium cocoate | 1-20 | Sodium lauryl sulfate | 1-20 | Polyglyceryl oleate | 0.1-10 |

TABLE 2-continued

| | Exemplary Concentrate Formulations | | | | | |
|---|---|---|---|---|---|---|
| 39 | Potassium oleate | 1-20 | Sodium lauryl sulfate | 1-20 | Polyglyceryl oleate | 0.1-10 |
| 40 | Potassium salt of C$_8$-C$_{10}$ fatty acids | 1-20 | Sodium lauryl sulfate | 1-20 | Polyglyceryl oleate | 0.1-10 |
| 41 | Sodium cocoate | 1-20 | Sodium lauryl sulfate | 1-20 | Polyglyceryl oleate | 0.1-10 |
| 42 | Potassium oleate | 1-20 | Sodium lauryl sulfate | 1-20 | Polyglyceryl oleate | 0.1-10 |
| 43 | Potassium salt of C$_8$-C$_{10}$ fatty acids | 1-20 | Sodium lauryl sulfate | 1-20 | Polyglyceryl oleate | 0.1-10 |
| 44 | Sodium cocoate | 1-20 | Sodium lauryl sulfate | 1-20 | Polyglyceryl oleate | 0.1-10 |
| 45 | Sodium cocoate | 1-20 | Sodium lauryl sulphate | 1-20 | Polyglyceryl oleate | 0.1-10 |
| 46 | Sodium cocoate | 1-20 | Sodium lauryl sulfate | 1-20 | Polyglyceryl oleate | 0.1-10 |
| 47 | Sodium cocoate | 1-20 | Sodium lauryl sulfate | 1-20 | Polyglyceryl oleate | 0.1-10 |
| 48 | Potassium cocoate | 20-50 | — | — | — | — |
| 49 | Sodium cocoate | 1-20 | Sodium lauryl sulfate | 1-20 | Polyglyceryl oleate | 0.1-10 |
| 50 | Potassium cocoate | 20-50 | — | — | — | — |

| Example | Solvent, percentage | | | | | |
|---|---|---|---|---|---|---|
| 1 | Water | 10-70 | Ethyl lactate | 10-70 | — | — |
| 2 | Water | 10-70 | Ethyl lactate | 10-70 | — | — |
| 3 | Water | 10-70 | Ethyl lactate | 10-70 | — | — |
| 4 | Water | 10-70 | Ethyl lactate | 10-70 | — | — |
| 5 | Water | 10-70 | Ethyl lactate | 10-70 | — | — |
| 6 | Water | 10-70 | Ethyl lactate | 10-70 | — | — |
| 7 | Water | 10-70 | Ethyl lactate | 10-70 | — | — |
| 8 | Water | 10-70 | Ethyl lactate | 10-70 | — | — |
| 9 | Water | 10-70 | Ethyl lactate | 10-70 | — | — |
| 10 | Water | 10-70 | Ethyl lactate | 10-70 | — | — |
| 11 | Ethyl lactate | 10-70 | Ethyl lactate | 10-70 | — | — |
| 12 | Water | 10-70 | Ethyl lactate | 10-70 | — | — |
| 13 | Isopropyl alcohol | 10-70 | — | — | — | — |
| 14 | Castor oil | 10-70 | Ethyl lactate | 10-70 | — | — |
| 15 | Butyl lactate | 10-70 | Ethyl lactate | 10-70 | — | — |
| 16 | Ethyl lactate | 10-70 | Water | 10-70 | — | — |
| 17 | Ethyl lactate | 10-70 | Water | 10-70 | — | — |
| 18 | Ethyl lactate | 10-70 | Water | 10-70 | — | — |
| 19 | Ethyl lactate | 10-70 | Water | 10-70 | — | — |
| 20 | Water | 10-70 | Ethyl lactate | 10-70 | Mineral oil | 10-70 |
| 21 | Water | 10-70 | Ethyl lactate | 10-70 | Mineral oil | 10-70 |
| 22 | Water | 10-70 | Mineral oil | 10-70 | — | — |
| 23 | Water | 10-70 | Ethyl lactate | 10-70 | — | — |
| 24 | Ethyl lactate | 10-70 | Mineral oil | 10-70 | — | — |
| 25 | Water | 10-70 | Ethyl lactate | 10-70 | — | — |
| 26 | Water | 10-70 | Ethyl lactate | 10-70 | — | — |
| 26 | Water | 10-70 | Ethyl lactate | 10-70 | — | — |
| 27 | Water | 10-70 | Ethyl lactate | 10-70 | — | — |
| 28 | Isopropyl myrisate | 10-70 | Mineral oil | 10-70 | — | — |
| 29 | Water | 10-70 | Ethyl lactate | 10-70 | — | — |
| 30 | Water | 10-70 | Ethyl lactate | 10-70 | — | — |
| 31 | Water | 10-70 | Ethyl lactate | 10-70 | — | — |
| 32 | Water | 10-70 | Ethyl lactate | 10-70 | — | — |
| 33 | Water | 10-70 | Ethyl lactate | 10-70 | — | — |
| 34 | Water | 10-70 | Ethyl lactate | 10-70 | — | — |
| 35 | Water | 10-70 | Ethyl lactate | 10-70 | — | — |
| 36 | Water | 10-70 | Ethyl lactate | 10-70 | — | — |
| 37 | Water | 10-70 | Ethyl lactate | 10-70 | — | — |
| 38 | Water | 10-70 | Ethyl lactate | 10-70 | — | — |
| 39 | Water | 10-70 | Ethyl lactate | 10-70 | — | — |
| 40 | Water | 10-70 | Ethyl lactate | 10-70 | — | — |
| 41 | Water | 10-70 | Ethyl lactate | 10-70 | — | — |
| 42 | Water | 10-70 | Ethyl lactate | 10-70 | — | — |
| 43 | Water | 10-70 | Ethyl lactate | 10-70 | — | — |
| 44 | Water | 10-70 | Ethyl lactate | 10-70 | — | — |
| 45 | Water | 10-70 | Ethyl lactate | 10-70 | — | — |
| 46 | Water | 10-70 | Ethyl lactate | 10-70 | — | — |
| 47 | Water | 10-70 | Ethyl lactate | 10-70 | — | — |
| 48 | Ethyl lactate | 10-70 | — | — | — | — |
| 49 | Water | 10-70 | Ethyl lactate | 10-70 | — | — |
| 50 | Isopropyl alcohol | 10-70 | — | — | — | — |

TABLE 3

| | | | | | | |
|---|---|---|---|---|---|---|
| | Exemplary Formulations | | | | | |
| Formula | Ingredient 1 Name | Ingredient 1 (% by weight) | Ingredient 2 Name | Ingredient 2 (% by weight) | Ingredient 3 Name | Ingredient 3 (% by weight) |
| 1 | Geraniol | 0.01-10 | Citronella oil | 0.01-10 | Cornmint oil | 0.01-10 |
| 2 | Geraniol | 0.01-10 | Citronella oil | 0.01-10 | Cedarwood oil | 0.01-10 |
| 3 | Geraniol | 0.01-10 | Citronella oil | 0.01-10 | Cedarwood oil | 0.01-10 |
| 4 | Geraniol | 0.01-10 | Citronella oil | 0.01-10 | Cedarwood oil | 0.01-10 |
| 5 | Geraniol | 0.01-10 | Thyme oil | 0.01-10 | Sodium bicarbonate | 1-95 |
| 6 | Geraniol | 0.01-10 | Citronella oil | 0.01-10 | Cedarwood oil | 0.01-10 |
| 7 | Geraniol | 10-40 | Cornmint oil | 410-40 | Clove oil | 10-40 |
| 8 | Geraniol | 10-40 | Citronella oil | 10-40 | Cedarwood oil | 10-40 |
| 9 | Geraniol | 10-40 | Citronella oil | 10-40 | Eugenol | 10-40 |
| 10 | Geraniol | 10-40 | Thyme oil | 10-40 | Eugenol | 10-40 |
| 11 | Geraniol | 10-40 | Thymol | 10-40 | Eugenol | 10-40 |
| 12 | Geraniol | 0.01-10 | Thymol | 0.01-10 | Eugenol | 0.01-10 |
| 13 | Geraniol | 0.01-10 | Thymol | 0.01-10 | Eugenol | 0.01-10 |
| 14 | Geraniol | 0.01-10 | Commercial Thyme oil | 0.01-10 | Sodium hydroxide | 0.01-10 |
| 15 | Citronella oil | 0.01-10 | Sodium bicarbonate | 1-95 | Calcium carbonate | 1-95 |
| 16 | Carvacrol | 10-40 | Thymol | 10-40 | Linalool | 10-40 |
| 17 | Carvacrol | 0.01-10 | Thymol | 0.01-10 | Linalool | 0.01-10 |
| 18 | Carvacrol | 0.01-10 | Thymol | 0.01-10 | Linalool | 0.01-10 |

| Formula | Ingredient 4 Name | Ingredient 4 (% by weight) | Ingredient 5 Name | Ingredient 5 (% by weight) | Ingredient 6 Name | Ingredient 6 (% by weight) |
|---|---|---|---|---|---|---|
| 1 | Isopropyl Myristate | 0.01-10 | Mineral oil | 50-99 | — | — |
| 2 | Potassium Cocoate | 0.1-20 | Isopropanol | 1-20 | Water | 70-90 |
| 3 | Potassium Cocoate | 0.1-20 | Isopropanol | 1-20 | Water | 70-90 |
| 4 | Potassium Cocoate | 0.1-20 | Isopropanol | 1-20 | Water | 70-90 |
| 5 | Calcium Carbonate | 1-95 | Calcium silicate | 1-95 | — | — |
| 6 | Potassium Cocoate | 1-20 | Isopropanol | 1-20 | Water | 70-90 |
| 7 | Sodium cocoate | 1-20 | Sodium lauryl sulfate | 1-30 | Polyglyceryl oleate | 0.01-5 |
| 8 | Sodium cocoate | 1-20 | Sodium lauryl sulfate | 1-30 | Polyglyceryl oleate | 0.01-5 |
| 9 | Sodium cocoate | 1-20 | Sodium lauryl sulfate | 1-30 | Polyglyceryl oleate | 0.01-5 |
| 10 | Ethyl lactate | 1-30 | Polyglyceryl oleate | 0.01-5 | Sodium cocoate | 1-20 |
| 11 | Ethyl lactate | 1-30 | Polyglyceryl oleate | 0.01-5 | Sodium cocoate | 1-20 |
| 12 | Potassium Cocoate | 1-20 | Sodium laury sulfate | 1-30 | Isopropanol | 1-20 |
| 13 | Potassium Cocoate | 1-20 | Sodium laury sulfate | 1-30 | Isopropanol | 1-20 |
| 14 | Di sodium N-(2-Carboxyethyl)-N-dodecyl-beta-alanine | 1-10 | Sodium metasilicate pentahydrate | 1-10 | Sodium dodecyl-benzenesulfonate | 0.01-10 |
| 15 | Calcium silicate | 1-95 | — | — | — | — |
| 16 | — | — | — | — | — | — |
| 17 | Sodium caseinate | 40-90 | — | — | — | — |
| 18 | Palm oil | 40-90 | — | — | — | — |

TABLE 3-continued

Exemplary Formulations

| Formula | Ingredient 7 Name | Ingredient 7 (% by weight) | Ingredient 8 Name | Ingredient 8 (% by weight) | Ingredient 9 Name | Ingredient 9 (% by weight) |
|---|---|---|---|---|---|---|
| 1 | — | — | — | — | — | — |
| 2 | — | — | — | — | — | — |
| 3 | — | — | — | — | — | — |
| 4 | — | — | — | — | — | — |
| 5 | — | — | — | — | — | — |
| 6 | — | — | — | — | — | — |
| 7 | Water | 1-40 | Ethyl lactate | 1-30 | — | — |
| 8 | Water | 1-40 | Ethyl lactate | 1-30 | — | — |
| 9 | Water | 1-40 | Ethyl lactate | 1-30 | — | — |
| 10 | Sodium lauryl sulphate | 1-30 | Water | 1-40 | — | — |
| 11 | Sodium lauryl sulphate | 1-30 | Water | 1-40 | — | — |
| 12 | Water | 40-90 | — | — | — | — |
| 13 | Water | 40-90 | — | — | — | — |
| 14 | Alcohol ethoxylate | 0.1-5 | Isopropanol | 1-20 | Water | 40-90 |
| 15 | — | — | — | — | — | — |
| 16 | — | — | — | — | — | — |
| 17 | — | — | — | — | — | — |
| 18 | — | — | — | — | — | — |

TABLE 4

Additional Concentrate Formulations

| Formula | Ingredient 1 Name | Ingredient 1 (% by weight) | Ingredient 2 Name | Ingredient 2 (% by weight) | Ingredient 3 Name | Ingredient3 (% by weight) |
|---|---|---|---|---|---|---|
| 1 | Geraniol 60 | 1-40 | Citronella oil | 1-40 | Cedarwood oil | 1-40 |
| 2 | Geraniol 60 | 1-40 | Citronella oil | 1-40 | Cedarwood oil | 1-40 |
| 3 | Geraniol 60 | 1-40 | Citronella oil | 1-40 | Cedarwood oil | 1-40 |
| 4 | Geraniol 60 | 1-40 | Cornmint oil | 1-40 | Clove oil | 1-40 |
| 5 | Geraniol 60 | 1-40 | Cornmint oil | 1-40 | Clove oil | 1-40 |
| 6 | Geraniol 60 | 1-40 | Cornmint oil | 1-40 | Clove oil | 1-40 |
| 7 | Geraniol 60 | 1-40 | Cornmint oil | 1-40 | Peppermint oil | 1-40 |
| 8 | Geraniol | 1-40 | Thyme oil | 1-40 | Eugenol | 1-40 |
| 9 | Geraniol | 1-40 | Citronella oil | 1-40 | Cedarwood oil | 1-40 |
| 10 | Geraniol | 1-40 | Cornmint oil | 1-40 | Clove oil | 1-40 |

| Formula | Ingredient 4 Name | Ingredient 4 (% by weight) | Ingredient 5 Name | Ingredient 5 (% by weight) | Ingredient 6 Name | Ingredient 6 (% by weight) |
|---|---|---|---|---|---|---|
| 1 | Sodium cocoate | 1-15 | Sodium lauryl sulfate | 1-30 | Polyglyceryl oleate | 0.1-5 |
| 2 | Oleic acid | 1-15 | Potassium hydroxide | 0.01-5 | Sodium lauryl sulfate | 1-30 |
| 3 | $C_8$-$C_{12}$ fatty acids | 1-15 | Potassium hydroxide | 0.01-5 | Sodium lauryl sulfate | 1-30 |
| 4 | Sodium cocoate | 1-15 | Sodium lauryl sulfate | 1-30 | Polyglyceryl oleate | 0.1-5 |
| 5 | Cremerac OL 70 V | 1-15 | Potassium hydroxide | 0.01-5 | Sodium lauryl sulfate | 1-30 |
| 6 | LC810L | 1-15 | Potassium hydroxide | 0.01-5 | Sodium lauryl sulfate | 1-30 |
| 7 | Sodium cocoate | 1-15 | Sodium lauryl sulfate | 1-30 | Polyglyceryl oleate | 0.1-5 |

TABLE 4-continued

| | | | | | | |
|---|---|---|---|---|---|---|
| | | | Additional Concentrate Formulations | | | |
| 8 | Ethyl lactate | 14.0-19.0 | Polyglyceryl oleate | 0.01-2.0 | Sodium cocoate | 7.5-11.5 |
| 9 | Sodium cocoate | 7.5-11.5 | Sodium lauryl sulfate | 12.0-16.0 | Polyglyceryl oleate | 1.0-2.0 |
| 10 | Sodium cocoate | 7.5-11.5 | Sodium lauryl sulfate | 12.0-16.0 | Polyglyceryl oleate | 1.0-2.0 |

| Formula | Ingredient 7 Name | Ingredient 7 (% by weight) | Ingredient 8 Name | Ingredient 8 (% by weight) | Ingredient 9 Name | Ingredient 9 (% by weight) |
|---|---|---|---|---|---|---|
| 1 | Water | 16.0-27.0 | Ethyl lactate | 13.0-18.0 | — | — |
| 2 | Polyglyceryl oleate | 1.0-2.0 | Water | 16.0-27.0 | Ethyl lactate | 13.0-18.0 |
| 3 | Polyglyceryl oleate | 1.0-2.0 | Water | 16.0-27.0 | Ethyl lactate | 13.0-18.0 |
| 4 | Water | 16.0-27.0 | Ethyl lactate | 13.0-18.0 | — | — |
| 5 | Polyglyceryl oleate | 1.0-2.0 | Water | 18.5-22.5 | Ethyl lactate | 13.0-18.0 |
| 6 | Polyglyceryl oleate | 1.0-2.0 | Water | 18.5-22.5 | Ethyl lactate | 13.0-18.0 |
| 7 | Water | 16.0-27.0 | Ethyl lactate | 13.0-18.0 | — | — |
| 8 | Sodium lauryl sulphate | 12.0-16.0 | Water | 19.0-23.0 | — | — |
| 9 | Water | 16.0-27.0 | Ethyl lactate | 13.0-18.0 | — | — |
| 10 | Water | 16.0-27.0 | Ethyl lactate | 13.0-18.0 | — | — |

Additional compositions comprising the same or different blends of one or more essential oils, and optionally, surfactants, emulsifiers, solvents, additives, and/or inerts of the same or different concentrations have been described in the foregoing specification.

Example 2

Examples 3 and 4 from Table 2 represent exemplary commercial product concentrates. These concentrates were individually diluted with water at a rate of 3% vol/vol concentrate to water. As shown in FIGS. 1A and 1B, the concentrate from Example 4 mixed spontaneously to give a milky emulsion and stayed mixed as an emulsion for at least 8 hours after dilution. The three commercial products shown in FIGS. 1A and 1B did not mix well and separated within 5 minutes of addition.

Example 3

Compositions disclosed herein were prepared. For example, a composition described in Table 2, Example 4 was prepared by adding geraniol (1-40 g), cornmint oil (1-40 g), clove oil (1-40 g), and ethyl lactate (10-70 g) together and stirring until combined. Polyglyceryl oleate (0.5-3 g) was added, followed by sodium cocoate (3-20 g) and sodium lauryl sulfate (3-20 g). The mixture was stirred until combined.

The composition displayed increased homogeneity and stability in solution compared to other brands known in the art, as shown for Table 2, Example 4 in FIGS. 1A-1B. In this example the composition was diluted with water at a rate of 1-8 ounces of concentrate to 1 gallon of diluted solution. Samples of pests were treated with compositions according to the current disclosure by placing the pests into a container and spraying with the diluted solution. Samples of bed bugs treated with compositions of the current invention showed only about a 2 percent survival rate compared to a 76 percent survival rate afforded by other brands, as shown in FIG. 2. Samples of ants treated with compositions of the current invention showed only about a 10 percent survival rate compared to a 51 percent survival rate afforded by other brands, as shown in FIG. 2.

A variety of additional pests of varying life stages (e.g. egg, larva, pupa, and adult) were selected to be sprayed with a composition of the current invention. Cockroaches, flies, and litter beetles (larvae and adults) were sprayed with the composition and showed quick expiration after about 30 seconds following administration, as shown in FIGS. 3A (initial spray) and 3B (time elapsed).

Example 4

The concentrate formulation from Table 2, Example 4 was placed in a fogger without dilution, constituting an ultra-low volume (ULV) application, (London Fogger MAG ULV used), and an area inhabited by mosquitoes was fogged with the concentrate formulation at a rate of about 6 oz up to about 10 oz per acre. At least a 70% reduction of mosquito population was observed.

Exemplary aspects of the disclosure can further be described by the following, numbered paragraphs:

1. A composition comprising a blend of one or more essential oils and one or more components selected from the group consisting of a surfactant, an emulsifier and a solvent, the composition having a repelling, killing and/or resisting effect against one or more pests.

2. The composition of paragraph 1, wherein the composition acts as a biocide, a pesticide, an inseciticide, a nematicide, an anthemlminthic, a repellent, or a parasiticide for external and internal parasites in humans, animals, and crops.

3. The composition of paragraph 1, wherein the composition has an antimicrobial effect and acts as a bactericide, an antibacterial, an antiviral, an antifungal, or an herbicide for external and internal parasites in humans, animals, and crops.

4. The composition of paragraph 1, comprising at least two of the one or more components selected from the group consisting of a surfactant, an emulsifier and a solvent.

5. The composition of paragraph 1, comprising each of the one or more components selected from the group consisting of a surfactant, an emulsifier and a solvent.

6. The composition of paragraph 1, wherein the composition is provided in a concentrate formulation and configured to be diluted prior to use, optionally wherein the concentrate formulation can be diluted from about 1 part concentrate to about 0.25 parts up to about 1000 parts diluent.

7. The composition of paragraph 1, wherein the one or more essential oils is selected from the group consisting of geraniol, linalool, carvacrol, para-cymene, alpha-pinene, menthol, eugenol, carvacrol, citronella oil, citronellal, citronellol, cinnamaldehyde, cinnamol, mint oils including cornmint oil and peppermint oil, thyme oil, lemongrass oil, rosemary oil, oregano oil, clove oil, citronella oil, cedar oil, cinnamon oil, wintergreen oil, alpha-terpineol, camphor, carvacrol, delta-cadinene, e-beta-caryophyllene, e-sabinene, limonene, p-cymene-8-ol, cerpinen-4-ol, terpinolene, thymol vic-thymol, cedrol, 1,8-cineol, 3-carene, 3-octanol, 3-octanone, 6-ethyl-3,4-dimethylphenol, alpha-humulene, alpha-phellandrene, alpha-pinene, alpha-terpinene, alpha-thujene, aromadendrene, beta-pinene, beta-terpinene, borneol, bornyl acetate, camphene, carvacrol methyl ether, carvone, R-carvone, caryophyllene oxide, citronellal, citronellol, citronellal, e-beta-ocimene, eugenol, gamma-terpinene, geranyl acetate, isoeugenol, ledene, lemongrass oil, limonene, Linalool, menthol, methyl isoeugenol, methyl salicylate, myrcene, nerol, nootkatone, ocimene, p-cymene, safrol, terpinene-4-ol, terpineol, thymol acetate, Z-beta-ocimene, Z-linalool oxide, and/or combinations thereof.

8. The composition of paragraph 1, wherein the blend of one or more essential oils comprises a concentration of at least about 1% by weight up to about 75% by weight.

9. The composition of paragraph 1, wherein the surfactant is selected from the group consisting of organosulfates or organosulfonates such as sodium lauryl sulfate or sodium laureth sulfate; soaps (C6-C20 fatty acid metal salts, such as sodium caprylate or potassium laurate, or the saponification products of long-chain fatty acids or fatty acid esters), or other detergents, and combinations thereof.

10. The composition of paragraph 1, wherein the surfactant comprises a combination of up to three surfactants and/or detergents, wherein each surfactant comprises a concentration of about 1% by weight up to about 50% by weight.

11. The composition of paragraph 1, wherein the emulsifier comprises a glyceryl ester, and wherein the emulsifier comprises a concentration of about 0.1% by weight up to about 5% by weight.

12. The composition of paragraph 1, wherein the solvent is selected from the group consisting of water, ethyl lactate, isopropyl alcohol, butyl lactate, mineral oil, castor oil, and combinations thereof.

13. The composition of paragraph 1, wherein the solvent comprises a combination of up to three solvents, wherein each solvent comprises a concentration of about 1% by weight up to about 90% by weight.

14. The composition of paragraph 1, further comprising an additive, wherein the additive is a Celite 610.

15. The composition of paragraph 1, wherein the components of the composition have an additive effect.

16. The composition of paragraph 1, wherein the components of the composition have a synergistic effect.

17. The composition of paragraph 1, wherein the composition is effective in repelling, killing, and/or resisting arthropods, internal parasites, and external parasites in humans, animals and crops.

18. The composition of paragraph 1, wherein the composition comprises a formulation, the formulation comprising:

a. An essential oil or combination of essential oils selected from a group consisting of geraniol, citronella oil, cornmint oil, thyme oil, cedarwood oil, clove oil, peppermint oil, and eugenol;

b. An additive, wherein the additive is celite;

c. A surfactant or combination of additives selected from a group consisting of sodium cocoate, potassium oleate, potassium salt of C8-C10 fatty acids, potassium cocoate, and sodium lauryl sulfate;

d. An emulsifier, wherein the emulsifier is polyglyceryl oleate; and, e. A solvent or combination of solvents selected from a group consisting of water, ethyl lactate, isopropyl alcohol, castor oil, butyl lactate, and mineral oil.

19. The composition of paragraph 1, further comprising an inert ingredient or combination of inert ingredients, wherein the inert ingredient or combination of inert ingredients is selected from a group consisting of almond oil, ascorbyl palmitate, (+)-butyl lactate, butyl lactate, butyl stearate, calcium carbonate, calcium oxide silicate, calcium silicate, carbon dioxide, carboxymethyl cellulose, carnauba wax, caseins, castor oil, hydrogenated castor oil, cellulose, cellulose carboxymethyl ether, sodium salt, citric acid, citric acid monohydrate, cod-liver oil, corn cobs, cottonseed meal, decanoic acid monoester, 1,2,3-propanetriol, dextrins, diglyceryl monooleate, diglyceryl monostearate, dilaurin, dipalmitin, dipotassium citrate, disodium citrate, disodium sulfate, diatomaceous earth, dodenoic acid monoester, (+)-ethyl lactate, ethyl lactate, glycerin, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, glyceryl stearate, hydrogenated cottonseed, hydrogenated rapeseed, hydrogenated soybean, hydroxyethyl cellulose, hydroxypropyl cellulose, hydroxypropyl methyl cellulose, isopropyl alcohol, isopropyl myristate, lauric acid, linseed oil, magnesium oxide, magnesium oxide silicate, magnesium silicate, magnesium silicate hydrate, magnesium silicon, mineral oil, 1-monolaurin, 1-monomyristin, monomyristin, monopalmitin, monopotassium citrate, monosodium citrate, myristic acid, octanoic acid, potassium salt, oleic acid, palm oil, hydrogenated palm oil, palmitic acid, paraffin wax, polyethylene, polyglyceryl oleate, polyglyceryl stearate, anhydrous potassium aluminum silicate, potassium bicarbonate, potassium chloride, potassium citrate, potassium myristate, potassium oleate, potassium ricinoleate, potassium sorbate, potassium stearate, 1,2-propylene carbonate, amorphous fumed silica, amorphous silica precipitate and gel, silica, silica gel, precipitated crystalline-free silica gel, silica hydrate, vitreous silica, silicic acid, magnesium salt, soap, sodium alginate, sodium bicarbonate, sodium carboxymethyl cellulose, sodium chloride, sodium oleate, sodium ricinoleate, sodium stearate, sodium sulfate, tetraglyceryl monooleate, triethyl citrate, vanillin, vitamin E, wheat germ oil, wheat oil, white mineral oil, wintergreen oil, and xanthan gum.

20. The composition of paragraph 18, wherein the inert or combination of inerts comprises a concentration of about 0.5% by weight up to about 98% by weight.

21. A method of repelling, killing, and/or resisting effects of one or more pests, the method comprising administering a composition to a subject or location in need of treatment, wherein the composition comprises a blend of one or more essential oils and one or more components selected from the group consisting of a surfactant, an emulsifier and a solvent.

22. The method of paragraph 21, wherein the composition acts as a biocide, a pesticide, an inseciticide, a nematicide, an anthemlminthic, a repellent, or a parasiticide for pests in humans, animals, and crops.

23. The method of paragraph 21, wherein the composition is administered through a feed or foodstuff to be consumed by the subject for which pest-resistance is desired.

24. A method of treating a location(s), the method comprising applying a composition in, on, around, or near the location(s) to be treated, wherein the composition comprises a blend of one or more essential oils and one or more components selected from the group consisting of a surfactant, an emulsifier and a solvent, and whereby parasites in, on, around, or near the location(s) are repelled, killed, and/or resisted.

25. The method of paragraph 24, wherein the pests are selected from a group consisting of arthropods, nematodes, helminths, insect pests, internal parasites, and external parasites.

26. The method of paragraph 24, wherein the location(s) are selected from the group consisting of homes, apartment buildings, bakeries, beverage plants, bottling facilities, breweries, cafeterias, candy plants, canneries, cereal processing and manufacturing plants, dairy barns, poultry facilities, stock yards, flour mills, food processing plants, frozen food plants, homes, hospitals, hotels, houses, industrial buildings, kennels, kitchens, laboratories, manufacturing facilities, mausoleums, meat processing and packaging plants, meat and vegetable canneries, motels, nursing homes, office buildings, restaurants, schools, stores, supermarkets, warehouses and similar structures, building foundations, dairy facilities, drive-in restaurants, drive-in theaters, golf courses, parks, playgrounds, poultry houses, recreational areas, schools, urban areas, lawns, landscape areas, trees, turf, areas around bodies of water, and zoos.

27. The method of paragraph 24, wherein the components and concentrations of components to be used in the composition are decided based on the application factors, the application factors comprising:

a. Presence of crops, humans, and/or animals in the application area;

b. The species of pest to be repelled and/or killed; and, c. The quantity of pests in the area.

28. Any and all compositions, uses, and/or methods shown and/or described expressly or by implication in the information provided herewith, including but not limited to features that may be apparent and/or understood by those of skill in the art.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entirety. The present invention may be embodied in other specific forms without departing from the spirit or essential attributes thereof and, accordingly, reference should be made to the appended claims, rather than to the foregoing specification, as indicating the scope of the invention.

We claim:

1. An emulsion consisting essentially of:

a) an essential oil selected from the group consisting of geraniol, thyme oil, corn mint oil, clove oil, lemongrass oil, eugenol, peppermint oil, thymol, cedarwood oil, citronella oil and mixtures thereof;

b) a surfactant selected from the group consisting of sodium lauryl sulfate, sodium salts of caprylic acid, potassium salts of caprylic acid, capric acid, lauric acid, myristic acid, palmitic acid, stearic acid, arachidic acid, caproleic acid, lauroleic acid, myristoleic acid, palmitoleic acid, oleic acid, gadoleic acid, linoleic acid, α-linolenic acid, dihomo-γ-linolenic acid, arachidonic acid, eicosapentaenoic acid and mixtures thereof;

c) wherein the emulsifier is polyglyceryl oleate; and d) a solvent mixture consisting essentially of water and ethyl lactate.

2. The emulsion of claim 1, wherein the emulsion further consists essentially of celite.

3. The emulsion of claim 1, wherein the emulsion is administered to a subject or location in need of treatment to repel, kill, resist pests, or the combination thereof.

4. The emulsion of claim 1, wherein the emulsion acts as a biocide, a pesticide, an insecticide, a nematicide, an anthelmintic, a repellent, or a parasiticide for pests in humans, animals, and crops.

5. The emulsion of claim 1, wherein the emulsion is administered through feed or foodstuff to a subject to repel, kill, resist pests, or the combination thereof.

6. A method of repelling, killing, or resisting effects of one or more pests, the method comprising consisting essentially of administering the composition of claim 1 to a subject or a location in need of treatment.

7. The method of claim 6, wherein the composition acts as a biocide, a pesticide, an insecticide, a nematicide, an anthelmintic, a repellent, or a parasiticide for pests in humans, animals, and crops.

8. The method of claim 6, wherein the composition is administered through a feed or foodstuff to be consumed by the subject for which pest-resistance is desired.

* * * * *